United States Patent
Vlaiko et al.

(10) Patent No.: US 12,499,021 B2
(45) Date of Patent: Dec. 16, 2025

(54) SECURED FAILOVER ACCESS THROUGH DATA STORAGE DEVICE SIDE CHANNELS

(71) Applicant: Sandisk Technologies, Inc., Milpitas, CA (US)

(72) Inventors: Julian Vlaiko, Kfar Saba (IL); Judah Gamliel Hahn, Ofra (IL); Aki Bleyer, Even Yehuda (IL); Shay Benisty, Beer Sheva (IL); Alexander Bazarsky, Holon (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 327 days.

(21) Appl. No.: 18/355,787

(22) Filed: Jul. 20, 2023

(65) Prior Publication Data
US 2024/0427677 A1    Dec. 26, 2024

Related U.S. Application Data

(60) Provisional application No. 63/510,347, filed on Jun. 26, 2023.

(51) Int. Cl.
G06F 11/20    (2006.01)
G06F 3/06     (2006.01)

(52) U.S. Cl.
CPC ........ *G06F 11/2092* (2013.01); *G06F 3/0616* (2013.01); *G06F 3/0644* (2013.01); *G06F 3/0659* (2013.01); *G06F 3/0679* (2013.01)

(58) Field of Classification Search
CPC .. G06F 11/2092; G06F 3/0616; G06F 3/0644; G06F 3/0659; G06F 3/0679; G06F 3/0688; G06F 3/0623; G06F 3/0652; G06F 11/2007
USPC .................................................. 714/2
See application file for complete search history.

(56) References Cited

U.S. PATENT DOCUMENTS

| | | | |
|---|---|---|---|
| 7,181,743 B2 * | 2/2007 | Werme | H04L 67/1008 709/219 |
| 7,234,033 B2 * | 6/2007 | Watanabe | G06F 11/2074 710/52 |
| 9,817,732 B1 | 11/2017 | Fair | |
| 10,255,955 B2 | 4/2019 | Huen | |
| 11,354,204 B2 * | 6/2022 | Shah | G06F 11/2007 |
| 11,531,498 B2 | 12/2022 | Moshe | |
| 11,775,907 B1 * | 10/2023 | Recck | G06Q 10/067 714/2 |
| 12,086,431 B1 * | 9/2024 | Dreier | G06F 16/1827 |

(Continued)

*Primary Examiner* — Albert Decady
*Assistant Examiner* — Enam Ahmed
(74) *Attorney, Agent, or Firm* — Patent Law Works LLP

(57) ABSTRACT

Systems, methods, and data storage devices for secured failover access through data storage device side channels are described. Storage devices may include a storage interface and one or more side channels, such as control bus and debug bus interfaces. The different interfaces may use different interface protocols and physical interface connections configured for different types of commands to the data storage device. When a failure of the storage interface occurs, the data storage device may receive a failover message through one or more side channels to reconfigure the side channel interface to receive, execute, and return a response for host storage commands targeting host data on the storage medium.

20 Claims, 8 Drawing Sheets

(56) References Cited

U.S. PATENT DOCUMENTS

| | | | |
|---|---|---|---|
| 2005/0081080 A1* | 4/2005 | Bender | H04L 41/0668 |
| | | | 714/2 |
| 2008/0285436 A1* | 11/2008 | Robinson | H04L 45/00 |
| | | | 714/2 |
| 2021/0011991 A1* | 1/2021 | Schmitz | H04L 9/0643 |
| 2023/0393772 A1 | 12/2023 | Benisty | |

* cited by examiner

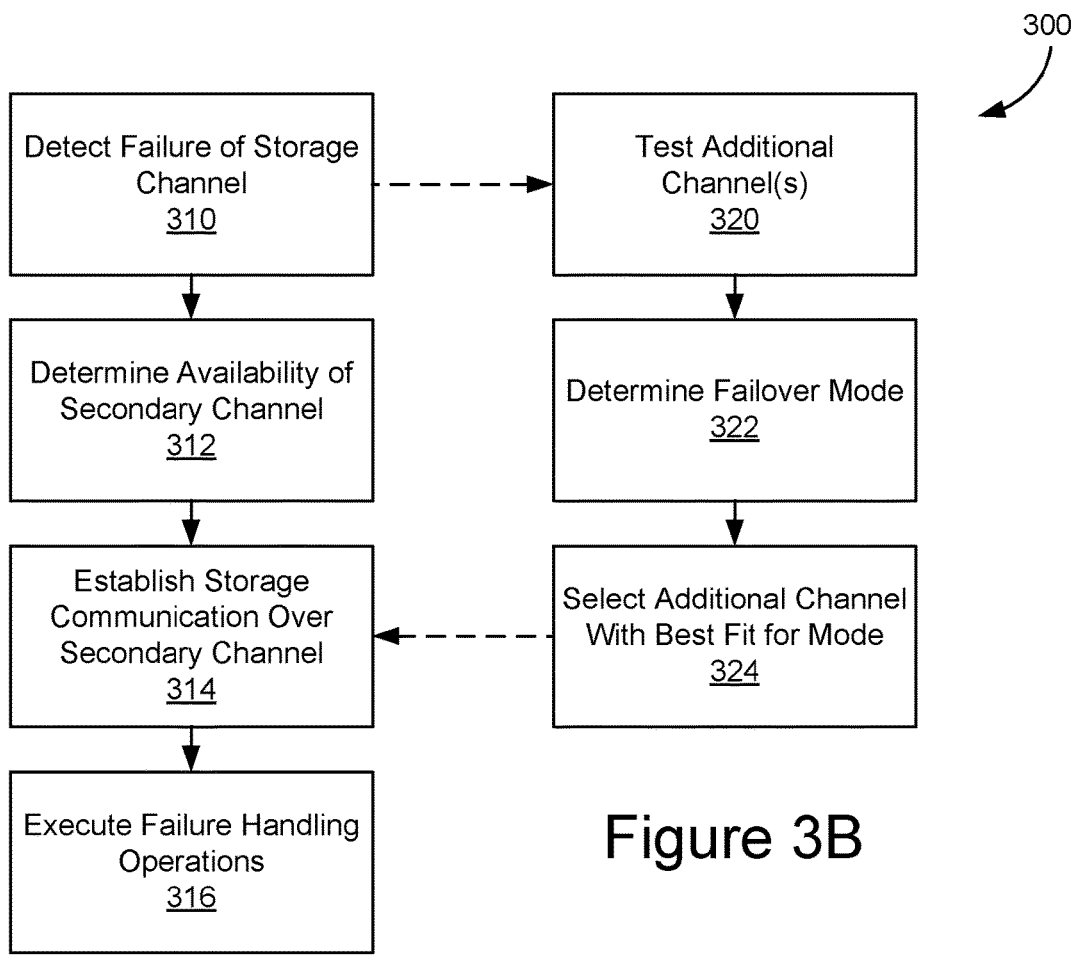
Figure 3B
Figure 3A
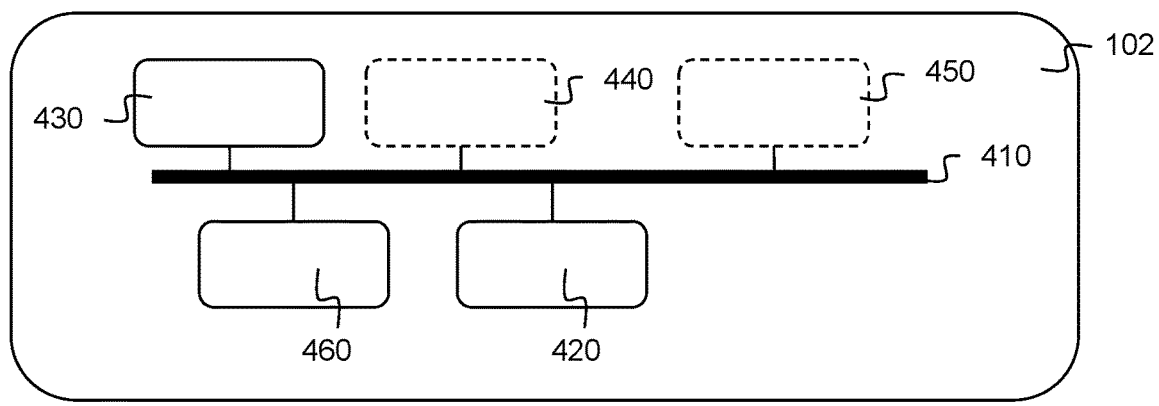
Figure 4

SECURED FAILOVER ACCESS THROUGH DATA STORAGE DEVICE SIDE CHANNELS

TECHNICAL FIELD

The present disclosure generally relates to data storage devices interconnected to a host system through multiple hardware channels and, more particularly, to secure failover of selective host storage commands in response to failure of a primary storage interface.

BACKGROUND

Some storage systems, such as storage arrays, may include multiple storage devices supporting one or more host systems through a peripheral or storage interface bus, such as peripheral component interconnect express (PCIe), serial advanced technology attachment (SATA), or serial attached [small computer serial interface (SCSI)] (SAS). These interfaces may be configured for high-bandwidth transfer rates, such as 3 gigabits (Gb)/second (s), 6 Gb/s, 8 Gb/s, 12 Gb/s, 16 Gb/s, etc., to enable fast and reliable data transfer to and from storage devices, with some versions supporting as high as 512 Gb/s.

Increasingly, multi-device storage systems are being integrated into complex electromechanical systems, such as the control systems and user interfaces for automobiles and other transportation systems. For example, electric cars with driver assistance and/or autonomous driving capabilities, utilize a variety of sensors and data connections to receive and aggregate data critical to operation and navigation of the vehicle. These systems may include one or more host systems that access and manage multiple discrete storage devices, generally disk drives (e.g., solid-state drives, hybrid drives, etc.), for storing and accessing large quantities of data during real-time operation of the system. These same systems may also log operational data for improvement and retraining of machine learning subsystems, analysis of failure modes, incident analysis, and other uses of historical data. While these storage systems may store data across multiple data storage devices according to a defined redundant array of independent disks (RAID) level, a combination of RAID schemas, or other configurations for providing desired data redundancy, performance, and capacity utilization, they may also be subject to catastrophic failure modes, such as those related to collisions, environmental extremes, or unusual electromechanical wear conditions. Because these complex system may simultaneously operate a number of independent computing systems with distinct host compute resources and data needs, the storage system may be partitioned and different host systems may be configured with different access credentials for accessing their respective data sets in the storage system.

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. In some configurations, each storage device may also include one or more additional interfaces that are configured for device management functions, rather than host input/output (I/O), generally using lower-bandwidth communication on different buses (sets of conductors or wires) using different interface protocols. For example, storage devices may include a control bus interface that complies with inter-integrated circuit (I2C), improved inter-integrated circuit (I3C), system management bus (SMBus), or similar low-bandwidth control bus protocols. These command buses may interconnect the storage devices within a multi-device storage system and provide a synchronous, multi-master, packet switched, serial communication bus. In some computing systems, control bus pins may be included as part of the physical peripheral interface connector. So, for example, a PCIe physical interface connector may include a set of I2C, I3C, or SMBus pins at one end of the connector for providing the low-bandwidth control interface. For comparison to the high-bandwidth peripheral interfaces used for data transfer, these low-bandwidth control bus interfaces may support ~3-30 megabits (Mb)/s and may operate as low as 100 kilobits (kb)/s.

In some configurations, each storage device in a multi-device storage system may also be connected to a debug bus through a physically separate debug interface. For example, each data storage device may include a debug port for receiving a debug interface cable separate from the PCIe interface cable. The debug ports of the devices may be connected to a debug bus that operates as a separate system used for troubleshooting the storage system and/or larger electromechanical system. Some data storage devices may include additional communication and/or power channels other than the primary storage interface and these additional channels may be referred to as side channels.

Providing additional failover options for data access and recovery beyond reliance on RAID configurations across multiple data storage devices may be advantageous. A reliable way of providing secure failover access to host data through one or more side channels may be needed.

SUMMARY

Various aspects for secure failover access to host data through one or more side channels, particularly dynamically reconfiguring available side channels to handle host storage commands in response to a storage interface failure, are described.

One general aspect includes a system that includes a data storage device including: a storage medium configured to store host data; a storage interface configured to use a first interface protocol and a first physical bus connection, and connect to a host system for transferring host storage commands and host data; a side channel interface configured to use a second interface protocol and a second physical bus connection, and connect to the host system for transferring low-bandwidth device management commands; and a controller. The controller is configured to: receive, through the side channel interface, a failover message indicating a failure of the storage interface; reconfigure the side channel interface to support selective processing of host storage commands; receive, through the side channel interface, a host storage command; execute, using the storage medium, the host storage command; and return, through the side channel interface, a response to the host storage command.

Implementations may include one or more of the following features. The controller may be further configured to: determine, responsive to the failover message, a failover access credential; and verify the failover access credential. Executing the host storage command may be responsive to verification of the failover access credential. The controller may be further configured to: map the failover access credential to at least one failover function; and verify, based on the at least one failover function, the host system has permission to send the host storage command. Executing the host storage command may be responsive to verification of the permission to send the host storage command. The at least one failover function may be selected from: write access to a predetermined partition of a plurality of partitions on the storage medium; read only access to the predetermined partition of the plurality of partitions on the storage medium; duplication, to a different data storage device, of the predetermined partition of the plurality of partitions on the storage medium; secure erase of the predetermined partition of the plurality of partitions on the storage medium; and transfer and secure erase of the predetermined partition of the plurality of partitions on the storage medium. The controller may be further configured to: determine, responsive to the failover message, a failover mode from a plurality of failover modes; determine a set of acceptable host storage commands for the failover mode; and verify the host storage command complies with the set of acceptable host storage commands. Executing the host storage command may be responsive to verification of compliance with the set of acceptable host storage commands. The controller may be further configured to: receive, through the side channel interface, an interface test message; and send, through the side channel interface, an interface test response message. The host system may be configured to determine, based on the interface test response, a failover capability of the side channel interface; and receiving the host storage command may be responsive to the interface test response. The side channel interface may be a selected side channel interface of a plurality of side channel interfaces of the data storage device and the controller may be further configured to: receive the interface test message through each side channel interface of the plurality of side channel interfaces; and send, through that side channel interface of the plurality of side channel interfaces, the interface test response. The plurality of side channel interfaces may include a control bus interface configured for low-bandwidth device control functions and a debug bus interface configured for low-bandwidth device debug functions; each side channel interface of the plurality of side channel interfaces may be configured to use a different interface protocol and a different physical interface bus; and the host system may be further configured to select the selected side channel interface from the plurality of side channel interfaces based on at least one interface test response through at least one side channel interface of the plurality of side channel interfaces. The system may include the host system and the host system may include: a host processor; a host memory, a host storage interface configured to, during a normal operating mode, communicate with the data storage device using the first interface protocol and the first physical bus connection for transferring host storage commands; a host side channel interface; and a host storage controller. The host side channel interface may be configured to: during the normal operating mode, communicate with the data storage device using the second interface protocol and the second physical bus connection for transferring low-bandwidth device management commands; and during a failover mode, communicate with the data storage device using the second interface protocol and the second physical bus connection for transferring host storage commands. The host storage controller may be configured to: determine the failure of the storage interface of the data storage device; determine, responsive to the failure of the storage interface of the data storage device, the failover mode; send, through the host side channel interface, the failover message; send, through the host side channel interface, the host storage command; and receive, through the host side channel interface, the response to the host storage command. The host memory may include a failover data structure and the failover data structure may include a plurality of interface entries corresponding to a plurality of physical interface connections to the data storage device. Each interface entry of the plurality of interface entries may include: an interface identifier for that physical interface connection; at least one set of failover access credentials for that physical interface connection; and at least one failover function for that physical interface connection. The host controller may be further configured to: test, responsive to the failure of the storage interface of the data storage device, the plurality of physical interface connections to determine at least one test metric for each physical interface connection of the plurality of physical interface connections; select the host side channel interface from the plurality of physical interface connections based on the at least one test metric, the failover mode, and the plurality of interface entries; send at least one failover access credential from the set of failover access credentials in the interface entry corresponding to the host side channel interface; and generate the host storage command based on the at least one failover function from the interface entry corresponding to the host side channel interface. The data storage device may further include a first power bus connection and a second power bus connection, and the host controller may be further configured to: determine a power failure for the first power bus connection; switch, responsive to the power failure, a power supply to the data storage device using the second power bus connection; and adjust, responsive to the failure of the storage interface of the data storage device, at least one interface parameter of the host side channel interface for transmission of the host storage command through the host side channel interface.

Another general aspect includes a computer-implemented method including, during a normal operating mode: transferring, through a storage interface using a first interface protocol and a first physical bus connection, host storage commands and host data from a host system for storage to a storage medium of a data storage device; and transferring, through a side channel interface using a second interface protocol and a second physical bus connection, low-bandwidth device management commands for execution by the data storage device. The computer-implemented method also includes, during a failover operating mode: receiving, by the data storage device and through the side channel interface, a failover message indicating a failure of the storage interface; reconfiguring, by the data storage device, the side channel interface to support selective processing of host storage commands; receiving, by the data storage device and through the side channel interface, a host storage command; executing, by the data storage device and using the storage medium, the host storage command; and returning, by the data storage device and through the side channel interface, a response to the host storage command.

Implementations may include one or more of the following features. The computer-implemented method may include: determining, by the data storage device and responsive to the failover message, a failover access credential; and verifying, by the data storage device, the failover access credential, where executing the host storage command is responsive to verification of the failover access credential. The computer-implemented method may include: mapping, by the data storage device, the failover access credential to at least one failover function; and verifying, based on the at least one failover function, the host system has permission to send the host storage command, where executing the host storage command is responsive to verification of the permission to send the host storage command. The computer-implemented method may include: determining, by the data storage device and responsive to the failover message, a failover mode from a plurality of failover modes; determining, by the data storage device, a set of acceptable host storage commands for the failover mode; and verifying, by the data storage device, the host storage command complies with the set of acceptable host storage commands, where executing the host storage command is responsive to verification of compliance with the set of acceptable host storage commands. The computer-implemented method may include: receiving, by the data storage device and through the side channel interface, an interface test message; sending, by the data storage device and through the side channel interface, an interface test response message; and determining, based on the interface test response, a failover capability of the side channel interface, where receiving the host storage command is responsive to the interface test response. The computer-implemented method may include: receiving, by the data storage device, the interface test message through each side channel interface of a plurality of side channel interfaces of the data storage device, where the plurality of side channel interfaces may include a control bus interface configured for low-bandwidth device control functions and a debug bus interface configured for low-bandwidth device debug functions, and each side channel interface of the plurality of side channel interfaces is configured to use a different interface protocol and a different physical interface bus; sending, by the data storage device and through each side channel interface of the plurality of side channel interfaces, the interface test response; and selecting, based on at least one interface test response from plurality of side channel interfaces, the side channel interface as a selected side channel interface of the plurality of side channel interfaces of the data storage device. The computer-implemented method may include: determining the failure of the storage interface of the data storage device; determining, responsive to the failure of the storage interface of the data storage device, the failover mode; sending, responsive to determining the failover mode and through the side channel interface, the failover message; sending, through the side channel interface, the host storage command; and receiving, through the side channel interface, the response to the host storage command. The computer-implemented method may include: accessing a failover data structure, where the failover data structure may include a plurality of interface entries corresponding to a plurality of physical interface connections to the data storage device, and each interface entry of the plurality of interface entries may include an interface identifier for that physical interface connection, at least one set of failover access credentials for that physical interface connection, and at least one failover function for that physical interface connection; testing, responsive to the failure of the storage interface of the data storage device, the plurality of physical interface connections to determine at least one test metric for each physical interface connection of the plurality of physical interface connections; selecting the side channel interface from the plurality of physical interface connections based on the at least one test metric, the failover mode, and the plurality of interface entries; sending at least one failover access credential from the set of failover access credentials in the interface entry corresponding to the side channel interface; and generating the host storage command based on the at least one failover function from the interface entry corresponding to the side channel interface. The computer-implemented method may further include: determining a power failure for a first power bus connection, where the data storage device may include the first power bus connection and a second power bus connection; switching, responsive to the power failure, a power supply to the data storage device using the second power bus connection; and adjusting, responsive to the failure of the storage interface of the data storage device, at least one interface parameter of the side channel interface for transmission of the host storage command through the side channel interface.

Still another general aspect includes a data storage device including: a storage medium configured to store host data; a storage interface configured to use a first interface protocol and a first physical bus connection, and connect to a host system for transferring host storage commands and host data; a side channel interface configured to use a second interface protocol and a second physical bus connection, and connect to the host system for transferring low-bandwidth device management commands; means for receiving, through the side channel interface, a failover message indicating a failure of the storage interface; means for reconfiguring the side channel interface to support selective processing of host storage commands; means for receiving, through the side channel interface, a host storage command; means for executing, using the storage medium, the host storage command; and means for returning, through the side channel interface, a response to the host storage command.

The various configurations advantageously apply the teachings of storage devices and/or multi-device storage systems to improve the functionality of such computer systems. The various configurations include operations to overcome or at least reduce the issues previously encountered in storage arrays and/or systems and, accordingly, are more reliable and/or efficient than other computing systems. That is, the various configurations disclosed herein include hardware and/or software with functionality to improve secure failover access to host data, such as by dynamically reconfiguring and using side channels to selectively process host storage commands in a failover mode. Accordingly, the configurations disclosed herein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

FIGS. 3A and 3B schematically illustrate a method of handling secure failover through side channels that may be used by the multi-device storage system of FIG. 1.

FIG. 4 schematically illustrates a host node of the multi-device storage system of FIG. 1.

DETAILED DESCRIPTION

Figure 1:
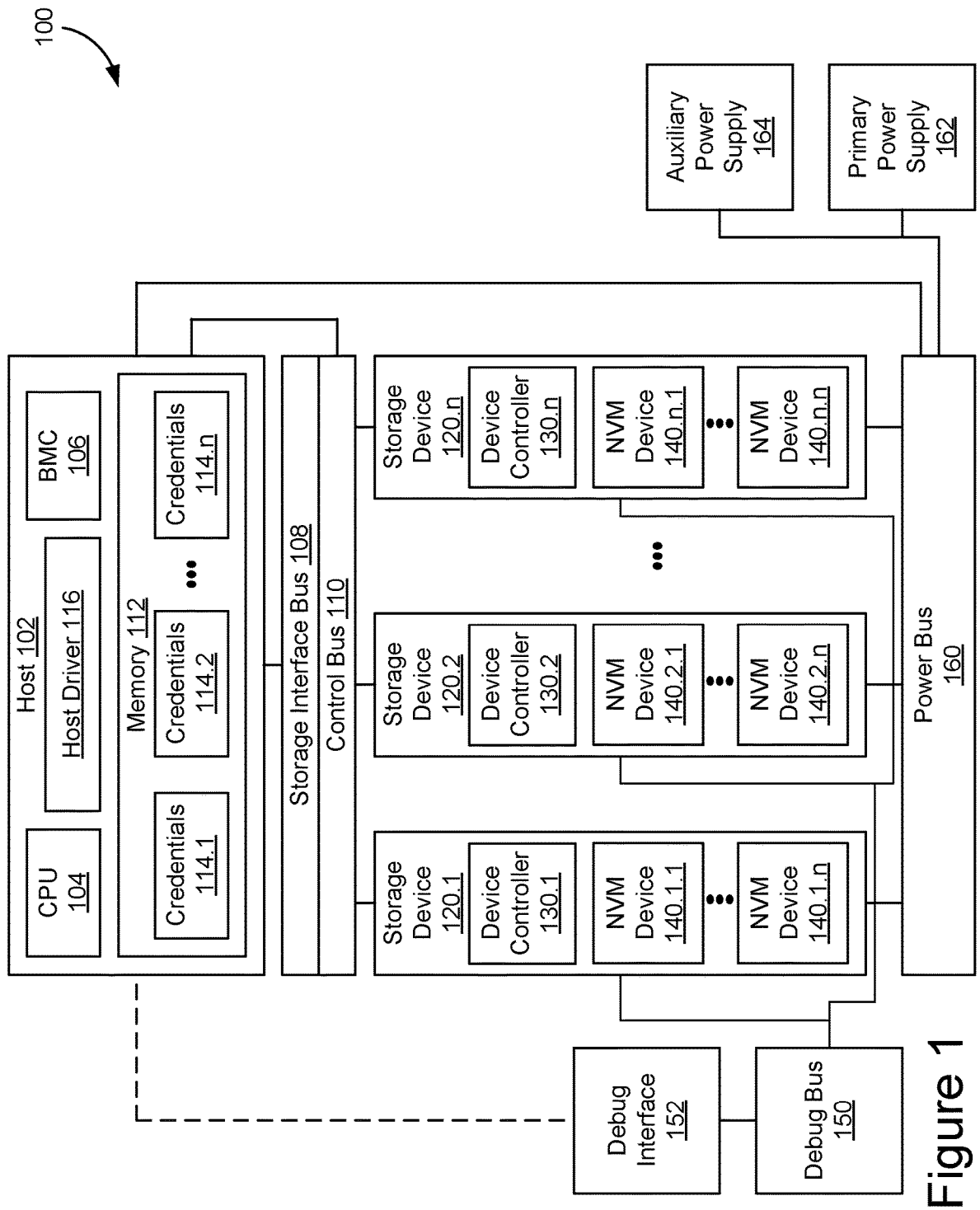
FIG. 1 schematically illustrates a multi-device storage system with multiple side channels.

FIG. 1 shows an embodiment of an example data storage system 100 with multiple data storage devices 120 interconnected by both storage interface bus 108 and multiple side channels, such as through control bus 110 and debug bus 150. While some example features are illustrated, various other features have not been illustrated for the sake of brevity and so as not to obscure pertinent aspects of the example configurations disclosed herein. To that end, as a non-limiting example, data storage system 100 includes one or more data storage devices 120 (also sometimes called information storage devices, storage devices, disk drives, or drives). In some configurations, storage devices 120 may be configured in an integrated storage system in a vehicle or similar electromechanical system. Storage devices 120 may interface with one or more hosts 102 and provide data storage and retrieval capabilities for or through those host systems. In some configurations, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network, though only storage devices 120 and host 102 are shown.

In the embodiment shown, a number of storage devices 120 are attached to one or more common storage interface buses for host communication. For example, storage devices 120 may include a number of drives arranged in a storage array, such as storage devices sharing a common chassis, unit, or blade in an integrated storage system. In some configurations, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 102. In some configurations, storage interface bus 108 may provide the primary host interface for storage device management and host data transfer, and control bus 110 may include limited connectivity to the host for low-level control functions. For example, a physical connector, such as a PCIe connector, may include a plurality of conductors, lanes, or wires for connecting each storage device 120 to storage interface bus 108 and control bus 110, such as 16 lanes used for the storage interface and 2 lanes used for the control bus. In some configurations, different storage devices 120 may be configured for different storage interface connectors, storage interface protocols, and/or storage interface buses. For example, storage system 100 may support the use of a combination of PCIe/NVMe, serial attached SATA, SAS, fibre channel, and/or other storage interfaces for storage devices 120. In spite of being configured with disparate primary storage interfaces, storage devices 120 in these configurations may share common control bus interface and/or debug bus interface protocols for failover use.

In some configurations, storage devices 120 may be referred to as a peer group or peer storage devices because they are interconnected through storage interface bus 108 and/or control bus 110. In some configurations, storage devices 120 may be configured for peer communication among storage devices 120 through storage interface bus 108, with or without the assistance of host 102. For example, storage devices 120 may be configured for direct memory access using one or more protocols, such as NVMe, remote direct memory access (RDMA), NVMe over fabric (NVMeOF), etc., to provide command messaging and data transfer between storage devices using the high-bandwidth storage interface and storage interface bus 108.

In some configurations, storage devices 120 may be configured for peer communication using multi-master discovery and messaging compliant with a low-bandwidth interface standard. For example, storage devices 120 may be configured for packet-based messaging through control bus 110 using a low-bandwidth bus protocol, such as inter-integrated circuit (I2C), improved inter-integrated circuit (I3C), system management bus (SMBus), etc. Storage devices 120 may be interconnected by a common control bus to provide a low-bandwidth communication channel with host 102 and other system components to assist with power management, discovery, and access to external resources, such as temperature sensors, fan controllers, light emitting diode (LED) indicators, etc. For example, control bus 110 may connect storage devices 120 to a baseboard management controller (BMC) 106 for monitoring the physical state of storage devices 120 for host 102. Storage devices 120 may be defined as peer storage devices based on their connection to a shared control bus 110.

In some configurations, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some configurations, a respective data storage device 120 of the one or more data storage devices includes one or more NVM controllers, such as flash controllers or channel controllers (e.g., for storage devices having NVM devices in multiple memory channels). In some configurations, data storage devices 120 may each be packaged in a housing, such as a multi-part sealed housing with a defined form factor and ports and/or connectors for interconnecting with storage interface bus 108 and/or control bus 110. Data storage devices 120 may each also include a debug port that provide a separate wired connection to debug bus 150.

In some configurations, a respective data storage device 120 may include a single medium device while in other configurations the respective data storage device 120 includes a plurality of media devices. In some configurations, media devices include NAND-type flash memory or NOR-type flash memory. In some configurations, data storage device 120 may include one or more hard disk drives (HDDs). In some configurations, data storage devices 120 may include a flash memory device, which in turn includes one or more flash memory die, one or more flash memory packages, one or more flash memory channels or the like. However, in some configurations, one or more of the data storage devices 120 may have other types of non-volatile data storage media (e.g., phase-change random access memory (PCRAM), resistive random access memory (Re- RAM), spin-transfer torque random access memory (STT-RAM), magneto-resistive random access memory (MRAM), etc.).

In some configurations, each storage device 120 includes a device controller 130, which includes one or more processing units (also sometimes called CPUs or processors or microprocessors or microcontrollers) configured to execute instructions in one or more programs. In some configurations, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some configurations, media devices 140 in storage devices 120 are divided into a number of addressable and individually selectable blocks, sometimes called erase blocks. In some configurations, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some configurations (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some configurations, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, storage device 120 may support physical and/or logical partitions configured to divide storage locations on a particular data storage device for access by different applications and/or hosts without exposing access to a given partition except by specifically authorized host systems and corresponding credentials. For example, each storage device 120 may be configured in predefined namespaces and those namespaces may be mapped to specific host systems for access.

In some configurations, host or host system 102 may be coupled to data storage system 100 through a network interface that is part of host fabric network that includes storage interface bus 108 as a host fabric interface. In some configurations, multiple host systems 102 (only one of which is shown in FIG. 1) are coupled to data storage system 100 through the fabric network, which may include a storage network interface or other interface capable of supporting communications with multiple host systems 102. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. In some configurations, integrated storage systems may support multiple hosts defined within a larger electromechanical system, such as a vehicle with a motor control system, a navigation system, a collision avoidance system, a user interface system, a data logging system, and/or other systems that may be supported by multiple distinct host systems with different compute resources.

Host system 102, or a respective host in a system having multiple hosts, may be any suitable computer device, such as an integrated computer, user interface computer, system or subsystem controller, or any other computing device. Host system 102 is sometimes called a host, client, or client system. In some configurations, storage system 100 may be configured to support a stationary computing system and host system 102 may be a server system, such as a server system in a data center, or a storage system, such as a storage array in a data center. In some configurations, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) 104 for executing compute operations or instructions for accessing storage devices 120 through storage interface bus 108. In some configurations, CPU 104 may include a processor and be associated with operating memory (not shown) for executing both storage operations and a storage interface protocol compatible with storage interface bus 108 and storage devices 120. In some configurations, a separate storage interface unit (not shown) may provide the storage interface protocol and related processor and memory resources. From the perspective of storage devices 120, storage interface bus 108 may be referred to as a host interface bus and provides a host data path between storage devices 120 and host 102.

Host system 102 may include a BMC 106 configured to monitor the physical state of host 102, storage devices 120, and/or other components of data storage system 100. In some configurations, BMC 106 may include processor, memory, sensor, and other resources integrated in BMC 106 and/or accessible over control bus 110. BMC 106 may be configured to measure internal variables within a housing, adjacent components, and/or from the components themselves within host 102 or data storage system 100, such as temperature, humidity, power-supply voltage, fan speeds, communication parameters, and/or operating system (OS) functions. BMC 106 may enable systems and components to be power cycled or rebooted as needed through control signals over control bus 110. In some configurations, BMC 106 may be configured to receive status communication from storage devices 120 through control bus 110 during boot cycles, prior to initialization of host communication through storage interface bus 108.

Host system 102 may include a memory 112 configured to support a plurality of host credentials 114 allocated to storage devices 120 and/or partitions defined therein. For example, the capacity of storage devices 120 may be allocated among a plurality of partitions and each partition may be associated with one or more sets of access credentials 114. Memory 112 may include one or more dynamic random access memory (DRAM) devices that store the partition or namespace definitions and the access credentials associated with them. For example, these sets of credentials 114 may include host identifiers, encryption/decryption keys, passcodes, and/or similar security features for authenticating host 102 to storage devices 120 during access. In the event of a failure of the primary host storage interface for host storage commands, credentials 114 may need to be validated through one or more side channels to ensure that secure access to host data in storage devices 120 is limited to authorized systems or subsystems embodied in host 102 and similar host systems. Each mapped pairing of a partition in storage devices 120 and authorized host system 102 may include unique host and partition or namespace identifiers. Additional access parameters may include additional authentication values, encryption-related key values, error correction values, and/or interface syntax parameters that determine how the host system accesses the particular namespace, such as flags, extensions, or other parameter values that enable or disable storage interface features. Host system 102 and storage devices 120 may authenticate messages, sessions, or access attempts received through storage interface bus 108 to determine whether valid access parameters are included in the access attempt. During failover operations, access attempts through side channels, such as control bus 110 or debug bus 150 may utilize similar processes, but may have to tunnel their authentication messages through the different interface protocols supported by those side channels.

Host system 102 may include a host driver 116 configured to manage host access to storage devices 120 and storage device access to host memory buffers and/or other host system resources. For example, host system 102 may include memory resources (e.g., host buffer memory), processor resources (e.g., CPU core), and/or specialized resources (e.g., error correction coded engines, computational accelerators, etc.) that are configured for access by storage devices over storage interface bus 108 using an access protocol and a unique set of access parameters allocated to that storage device. Host driver 116 may be configured to manage the discovery, allocation, authentication, and use of host resources by storage devices 120. For example, host driver 116 may comply with NVMe and/or RDMA standards for enabling storage device and host access to shared host memory buffers. Host driver 116 may also be configured to recognize side channels and initiate reconfiguration of those side channels for limited storage operations in response to a failure. For example, host driver 116 may maintain a failover table and related logic for managing failure modes and failure storage operations, as further described with regard to FIG. 2.

In some configurations, storage devices 120 may each include a debug port for a wired connection to debug bus 150. Debug bus 150 may be configured for access to debug, self-monitoring, analysis, and reporting technology (SMART), device configuration, operating log, and other maintenance and administrative data stored in the data storage device. In some configurations, the debug interfaces of storage device 120 may be configured to only provide one-way access from a debug system (which may not be a host system capable of accessing host data partitions) to the device management partitions of that storage device. For example, debug interface 152 may be configured as a one-way PCIe interface with a limited set of lanes, such as two or four lanes, for offloading debug data stored in storage devices 120. In some configurations, debug interface 152 on the host side of debug bus 150, may be configured for a maintenance system interface (sometimes external to the vehicle or other integrated system) and/or an error management system configured as a separate host system. In some configurations, during a failover mode, debug interface 152 may be selectively accessed from host 102 to establish a side channel connection and reconfigured it for the offload of host data from partitions not normally accessible through debug interface 152.

In some configurations, storage system 100 may support multiple power supplies through a power bus 160. For example, each data storage device may include at least two power interfaces connected to one or more power channels in power bus 160. For example, a primary power connector may be provided in power lanes of a PCIe connector and a secondary power connector may be provide in power lanes associated with the debug port and/or a separate power port. A primary power supply 162 may provide power to data storage devices 120 through power bus 160 during a normal operating mode. Auxiliary power supply 164 may provide power to data storage devices 120 through power bus 160 during a failover mode where the connection to primary power supply 162 has been interrupted.

Figure 2:
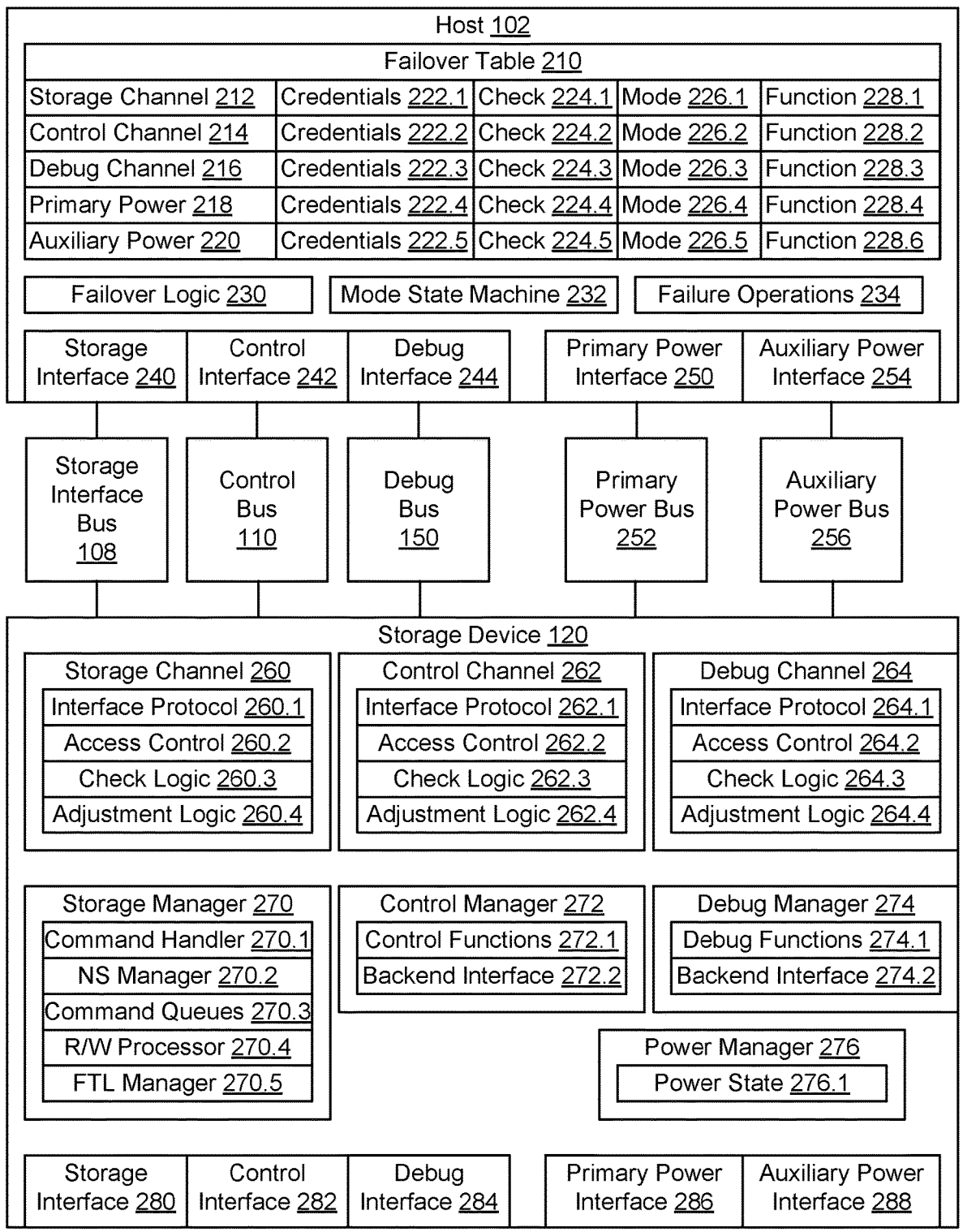
FIG. 2 schematically illustrates a secure failover architecture that may be used by the multi-device storage system of FIG. 1.

FIG. 2 shows a schematic representation of an example storage system 200, such as multi-device data storage system 100 in FIG. 1, configured with a secure failover through one or more side channels, such as control bus 110 or debug bus 150. Storage devices 120 may each be connected to control bus 110 for low-bandwidth communication with a low-level physical management and power control subsystem, such as BMC 106 in FIG. 1. Storage devices 120 may also be connected to debug bus 150 for selective access to error logs, configuration pages, and other device management data stored in storage devices 120. In some configurations, storage system 200 may be configured to reconfigure access through control bus 110 and/or debug bus 150 in response to a failure of host communications through storage interface bus 108. Such failover access may configure control bus 110 and/or debug bus 150 to transfer a limited subset of host storage commands for execution by target storage devices. For simplicity, only one host system 102 and one storage device 120 are shown in FIG. 2, but any number of hosts and storage devices may be configured similarly in an integrated storage system, such as a vehicle storage system.

Host 102 may be configured with a failover table 210 or a similar data structure for managing a plurality of primary and failover channels supported by distinct physical buses. In some configurations, failover table 210 may be configured in a host driver or similar storage driver of host 102. In the example shown, failover table 210 includes a primary storage channel 212 and failover channels to provide additional access options through control channel 214 and debug channel 216. Failover table 210 also includes power channels supported by different power supplies and/or buses with primary power channel 218 and auxiliary power channel 220. Each channel identifier 212-220 may correspond to a channel entry or row in failover table 210 that corresponds to a set of parameters for use in selectively reconfiguring channels during failover events. Failover table 210 may include credentials 222.1-222.5 storing corresponding sets of credentials for each channel used by host 102 to establish a host-storage connection for transfer and processing of host storage commands. For example, credentials 222 may include host identifiers and authentication data, such as encryption keys, passcodes, etc., for accessing host storage command processing through the transport and application layer interfaces of the corresponding channel. In some configurations, credentials 222 may include multiple sets of credentials for the same channel configured for executing host storage operations against different storage devices, partitions or namespaces, and/or corresponding modes 226 or functions 228.

In some configurations, failover table 210 may include check parameters 224.1-224.5 for one or more channel entries. For example, check parameters 224 may indicate a function or logic for testing the connection and/or capabilities of a particular channel. For example, check parameters 224 may include a series of checks to test physical, transport, and storage application level communication over the corresponding channel. In some configurations, check parameters 224 may be used to initiate one or more channel function tests used to quantify the level of access and transfer speeds available through each channel during a failure condition.

In some configurations, failover table 210 may include failure mode parameters 226.1-226.5 corresponding to one or failover modes in which that channel may be configured to operate. For example, host 102 may support multiple defined operating modes for accessing host data in storage device 120 during a failover condition. In some configurations, the failover modes may include a critical mode for accessing real-time host data that is critical to application function. For example, host data access may be required for operation of motor control, crash avoidance, or system safety operations that rely on ongoing read and/or write access to a corresponding partition. In some configurations, the failover modes may include a security mode for securing and/or erasing host data in one or more partitions. For example, partitions related to personally identifiable information, usage history, and/or other sensitive information may be configured with specific security requirements for access in the event of a failure condition. In some configurations, the failure modes may include a maintenance mode for enabling selective access to partitions and data types useful for diagnosing and repairing one or more systems or subsystems, such as motor, break, power, or other vehicle systems. In some configurations, the failover modes may include an investigation mode for enabling selective access to historical logs related to the use and/or failure conditions of the system. In some configurations, the failover modes may include a replication mode for enabling host data from one or more partitions to be transferred from storage device 120 to another storage device inside or outside of the systems. Different failover modes may have different timing and bandwidth requirements, which may be reflected in their parameters and the corresponding parameters in that entry. For example, failover modes such as security mode, maintenance mode, and investigation mode, may not require real-time access and/or support lower transfer rates, while critical mode may require immediate, real-time access (at a required transfer rate). Other modes may be defined for the system and specialized modes may be configured for specific hosts, application systems, failure conditions, and partitions or host data types. Host system 102 may use failover mode parameters to index failover table for a current failover mode to filter failover channels and determine functions 228 that may be accessible through that channel for that mode.

In some configurations, failover table 210 may include function parameters 228.1-228.5 corresponding to the data access functions supported by that channel during the corresponding failover mode (or modes). For example, secure failover processing may include limited access to host data, and failover functions 228 may map channels, credentials, current capabilities, and failover modes to authorized functions for that set of conditions. In some configurations, failover functions may include partition read (including read-only access), partition write (which may be limited to new writes, not overwriting), secure erase, data copy, destructive transfer, and/or other data functions. Host 102 may use function parameters 228.1-228.5 to determine the types of host storage operations that may be executed through a failover channel.

Host 102 may be configured with one or more functional modules comprised of functions, parameters, data structures, and/or interfaces that use the parameters in failover table 210 to respond to and manage host data access during failure events. For example, host 102 may include failover logic 230, mode state machine 232, and failure operations manager 234 as software functions stored in memory for execution by a processor. Failover logic 230 may include a set of logical rules for responding to a failure of one or more channels. For example, failover logic 230 may determine or receive an indication that a primary storage path, such as a storage interface channel through storage interface bus 108, is in a failure state and no longer capable of handling host storage commands as normal, and determine whether and which side channels may be used for completing host storage operations. In some configurations, failover logic 230 may respond to a failure of host storage commands sent through storage interface 240 to trigger evaluation of side channel access. For example, failover logic 230 may access failover table 210 to identify possible side channels and evaluate whether one or more host storage connections can be established through those side channels. Failover logic 230 may select a failover channel from failover table 210 and initiate a host storage connection through that channel by sending a failover message to initiate reconfiguration of the side channel for host storage communication. The failover message and/or a subsequent process for establishing the storage connection may include providing corresponding credentials 222. Failover logic 230 may also use one or more failover test messages based on check parameters 224 to evaluate side channels, whether they can be established, and what level of functionality is available. In some configurations, failover logic 230 may evaluate each possible side channel connection and select a best secondary channel for host storage commands. For example, failover logic 230 may attempt to establish and test connections with multiple side channels and use performance metrics, failover mode, and desired host data operations to determine which side channel or side channels should be used. In some configurations, failover logic 230 may interface with mode state machine 232 to determine a failover mode based on error conditions, which may include feedback from failover test messages. In some configurations, failover logic 230 may interface with failure operation manager 234 to support maintenance and/or reevaluation of available side channels during processing of failure operations during a failover mode. In some configurations, failover logic 230 may include rules for evaluating a plurality of power channels supporting operation of storage device 120. For example, failover logic 230 may be configured to check a power state of storage device 120 and include rules for cycling power supplies and/or switching power supply connections through one or more power buses, such as primary power bus 252 and auxiliary power bus 256.

Mode state machine 232 may include logic for determining a failover mode for the host storage connections. For example, mode state machine 232 may be initialized in a normal operating mode during normal operation of storage interface 240 and processing of host storage commands through the primary storage channel. Responsive to a failure condition of storage interface 240, mode state machine 232 may check error logs, test results (such as from test messages sent through side channels by failover logic 230), operating parameters, state information from one or more other state machines, and/or parameters for determining a current failover state for host 102 and one or more storage connections. Mode state machine 232 may determine a current failover mode and continue to monitor parameters for updating the failover mode as failover logic 230 and/or failure operations manager 234 gather more data regarding the configuration and operation of the various channels. In some configurations, mode state machine 232 may support a set of predefined failover modes and select among those failover modes to determine the failover operations available to host 102. For example, a set of predefined failover modes may include critical mode, security mode, maintenance mode, and investigation mode. In some configurations, mode state machine 232 may determine a set of possible failover modes based on available side channels and include a hierarchy and/or system-selectable interface logic for determining which failover mode to set as the current operating mode.

Failure operations manager 234 may include logic for managing host storage commands sent through the side channel during a failover mode. For example, the failover mode may determine specific sets of storage operations, parameters, and target partitions or namespaces that may be executed in that failover mode and/or through a particular failover channel. In some configurations, failure operations manager 234 may access failover table 210 to determine what host storage commands may be sent through the failover channel. For example, using the failover channel and failover mode to index failover table 210, failure operations manager 234 may determine a set of failover functions 228 that may be used to generate and/or filter host storage operations supporting storage access by one or more applications of host 102. In some configurations, failure operations manager 234 may be configured to initiate and/or generate defined host storage operations for the failover mode. For example, failure operations manager 234 may initiate secure erase of specific partitions in response to a security mode or partition copy operations in response to an emergency replication mode.

Storage interfaces 240 and 280 may include physical interfaces for connecting host 102 to storage device 120 over storage interface bus 108 using an interface protocol that supports storage device access. For example, storage interfaces 240 and 280 may include a PCIe,/NVMe SATA, SAS, or similar storage interface connector supporting access to solid state media in storage device 120. Storage interfaces 240 and 280 may be supported by corresponding storage interface protocols for transport and application layer connections between host 102 and storage device 120. Note that not all storage devices in storage system 200 may use the same storage interface connectors and protocols. Control interfaces 242 and 282 may include physical interfaces for connecting to control bus 110 using a low-bandwidth interface protocol for low-level control messaging among computing components. For example, control interfaces 242 and 282 may include a I2C, I3C, SMBus, or similar bus interface connector supporting component-to-component messaging, such as multi-master, packet-based messaging over a two-wire bus. Control interfaces 242 and 282 may be supported by corresponding control interface protocols for transport and application layer connections between host 102 and storage device 120. Debug interfaces 244 and 284 may include physical interfaces for connecting to debug bus 150 using a limited access interface protocol, such as one-way PCIe or a proprietary debug interface protocol, and may be supported by the corresponding interface protocols for transport and application-layer connections between host 102 and storage device 120. In some configurations, host 102 and/or storage device 120 may not have a physical and/or logical connection to debug bus 150 during normal operation and, during a failover mode, a physical and/or logical switch may be initiated to connect the devices over debug bus 150. Primary power interface 250 may include a switch controller and power manager for a primary power source for storage device 120 connected through a primary power bus 252 to primary power interface 286. Auxiliary power interface 254 may include a switch controller and power manager for an auxiliary power source for storage device 120 connected through an auxiliary power bus 256 to auxiliary power interface 288.

Storage device 120 may be configured with a plurality of interface channels that connect to host 102. For example, storage device 120 may include storage channel 260 configured for normal host input/output operations over storage interface bus 108, a control channel configured for device control and management operations over control bus 110, and a debug channel 264 configured for selectively providing debug data to a debug system when accessed. Each interface channel may be paired with a corresponding processing manager configured to receive messages through that channel, process them, and provide corresponding responses. For example, storage device 120 may include a storage manager 270 configured to process host storage commands, a control manager 272 configured to process control commands, and a debug manager 274 configured to process debug commands. Storage device 120 may also include a power manager 276 for monitoring one or more power connections and associated power states 276.1, such as connected, normal power, and low power states.

Each interface channel may include a corresponding interface protocol, access control, check logic, and adjustment logic. Each channel may be supported by a physical interface connection and transport and application-level interface protocols for establishing communication across their respective buses. For example, storage channel 260 may include interface protocol 260.1 implementing PCIe interface standards, control channel 262 may include interface protocol 260.2 implementing SMBus interface standards, and debug channel 264 may include interface protocol 260.3 implementing one-way PCIe interface standards. Each channel may include access control logic to verify that messages received over their respective buses and protocols are legitimate messages from an authorized host system. For example, access control 260.2, 262.2, and 264.2 may each implement connection, session, and/or message authentication based on host identifiers and, in some configurations, may implement one or more encryption standards for securing communications. Each channel may include check logic to enable host systems to verify and/or quantify the quality of communications over the corresponding channel. For example, check logic 260.3, 262.3, and 264.3 may include test message, ping, and/or handshake handling for the respective interface protocols that convey connection information and/or metrics back to the host. Each channel may include adjustment logic to adjust one or more interface parameters to establish and/or improve communication over their corresponding interfaces. For example, adjustment logic 260.4, 262.4, and 264.4 may include sets of configuration parameters that are adjusted to establish transport and application-level communication across the corresponding buses, generally used to initialize communication channels and reestablish communication after it is lost.

Storage manager 270 may include various functions for receiving and executing host storage commands using the non-volatile storage medium of storage device 120. For example, storage manager 270 may be configured to receive host storage commands through storage channel 260, parse them into backend storage operations, and execute those operations using the storage medium and previously stored host data. In some configurations, storage manager 270 may include a command handler 270.1, a namespace manager 270.2, command queues 270.3, read/write processor 270.4, and flash translation layer (FTL) manager 270.5. Command handler 270.1 may include logic for receiving and parsing host storage commands. Namespace manager 270.2 may include logic for determining the target namespace and corresponding host connection for the host storage commands. Command queues 270.3 may include pairs of submission queues and completion queues allocated to each host connection to a namespace. Read/write processor 270.4 may include interface logic for executing the host storage commands as backend storage operations against the storage medium, such as NVMe devices. FTL manager 270.5 may maintain the mapping of host data identifiers, such as logical block addresses or object identifiers, to physical memory locations in the storage medium. During normal operation, storage manager 270 only receives host storage commands through storage channel 260. However, during failover modes, control manager 272 and/or debug manager 274 may determine host storage commands received through their respective channels and forward them to storage manager 270 for processing.

Control manager 272 and debug manager 274 may be configured for processing their respective functions. For example, control manager 272 may receive control commands through control channel 262 and execute them using control functions 272.1. Similarly, debug manager 274 may receive debug commands through debug channel 264 and execute them using debug functions 274.1. During failover operations, where one or both of control channel 262 and debug channel 264 are selected for receiving host storage commands, control manager 272 and debug manager 274 may include backend interfaces 272.2 and 274.2 that enable them to identify host storage commands received through their respective protocols and forward them to command handler 270.1 of storage manager 270 for processing. Similarly, backend interfaces 272.2 and 274.2 may be configured to receive completion, return data, or other response messages from storage manager 270 and forward them back through their respective channels. By tunneling host storage commands and responses through control channel 262 and/or debug channel 264, these side channels may be used for failover processing of host input/output operations.

FIGS. 3A and 3B show an example method 300 of operating a storage systems, such as multi-device data storage system 100 in FIG. 1 and/or storage system 200 in FIG. 2, to handle secure failover through side channels, such as control or debug channels. A storage system may be operated according to method 300. FIG. 3A and blocks 310-316 show failover operations when only a single failover channel is available. FIG. 3B and blocks 320-324 show an alternative path for selecting among multiple channels for failover operations.

At block 310, failure of a storage channel may be detected. For example, a host system may determine that the primary storage channel to a storage device is no longer responding to attempts to send host storage commands through the storage bus interface.

At block 312, availability of a secondary channel may be determined. For example, the host system may be configured with one or more side channels that represent distinct physical and interface protocol connections between the host system and the storage device.

At block 314, storage communications may be established over the secondary channel. For example, the host system may send a failover message to the storage device through the side channel and using the side channel interface protocol to notify the storage device to reconfigure the side channel to receive and process host storage commands.

At block 316, failure handling operations may be executed through the secondary channel. For example, the storage device may reconfigure the side channel to receive and authenticate host storage commands over the side channel bus and protocol and forward them for host storage processing to complete defined failure handling operations for the host system.

At block 320, multiple channels may be tested in response to failure of the primary storage channel. For example, the host system may be configured with multiple side channels that may be available as failover channels for host storage commands and the host system may send test messages to the storage device through each of the side channels and collect the responses.

At block 322, a failover mode may be determined. For example, the host system may use the failure of the primary storage channel and the operating mode of the system to determine a failover mode and corresponding desired functions (types and targets of host storage commands) for the failure handling operations.

At block 324, an additional channel with the best fit for a failover mode may be selected. For example, the host system may compare the responses to the test messages at block 320 to determine which side channels are available for host communication and which of the available side channels is the best fit for processing failure handling operations for the current failover mode. Method 300 may proceed to block 314 to establish communications over the selected secondary channel and execute failure handling operations.

FIG. 4 shows a schematic representation of an example host system 102. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, host driver 116 in FIG. 1 may be instantiated in instructions, operations, or firmware stored in local memory 430 for execution by processor 420. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some configurations, communication interface 460 may include one or more peripheral interfaces, such as a PCIe interface for connecting to storage devices 120, and/or interfaces to associated BMC and debug systems.

Figure 5:
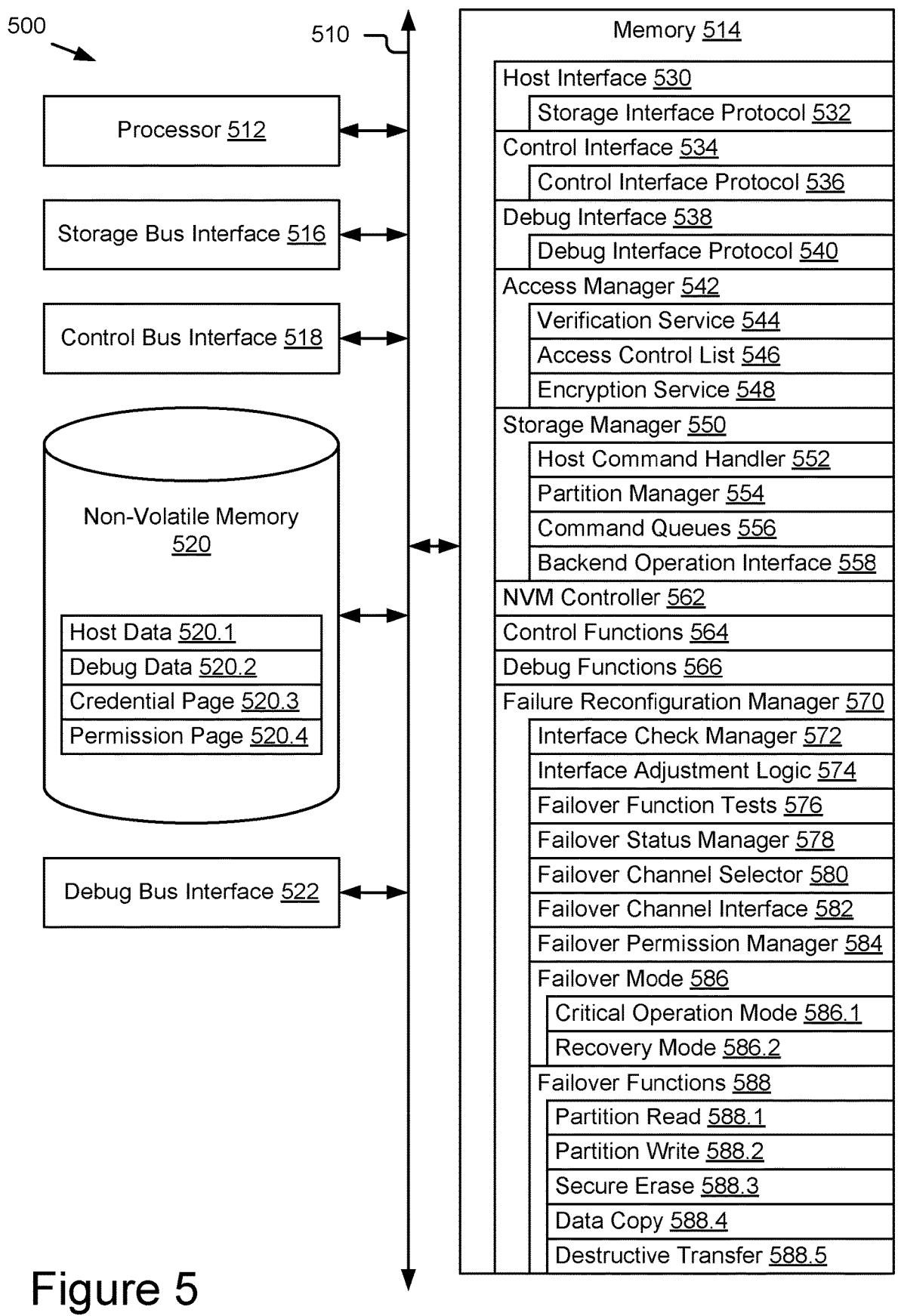
FIG. 5 schematically illustrates some elements of the storage devices of FIG. 1-2 in more detail.

FIG. 5 schematically shows selected modules of a storage device 500 configured for failover access through one or more side channels, such as storage devices 120. Storage device 500 may incorporate elements and configurations similar to those shown in FIGS. 1-2. For example, storage device 500 may be configured as a storage device 120 in an integrated storage system for a vehicle that supports multiple hosts corresponding to subsystems of the vehicle.

Storage device 500 may include a bus 510 interconnecting at least one processor 512, at least one memory 514, and at least one interface, such as storage bus interface 516, control bus interface 518, and/or debug bus interface 522. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to a host using an interface protocol that supports storage device access. For example, storage bus interface 516 may include a PCIe, SATA, SAS, or similar storage interface connector supporting NVMe access to solid state media comprising non-volatile memory devices 520. Control bus interface 518 may include a physical interface for connecting to a control bus using a low-bandwidth interface protocol for low-level control messaging among computing components. For example, control bus interface 518 may include a I2C, I3C, SMBus, or similar bus interface connector supporting component-to-component messaging, such as multi-master, packet-based messaging over a two-wire bus. Debug bus interface 522 may include a physical interface for connecting to a debug bus using a limited use debug interface protocol for selective access to debug information stored by storage device 500. For example, debug bus interface 522 may include a small PCIe interface connector with a limited number of lanes, such as two lanes.

Storage device 500 may include one or more non-volatile memory devices 520 configured to store host data 520.1 and, in some configurations, one or more partitions of system data, such as debug data 520.2 and configuration pages (e.g., credential page 520.3, permission page 520.4, etc.). For example, non-volatile memory devices 520 may include a plurality of flash memory packages organized as an addressable memory array. In some configurations, non-volatile memory devices 520 may include NAND or NOR flash memory devices comprised of single level cells (SLC), multiple level cell (MLC), or triple-level cells.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests from client or host systems. Memory 514 may include a control interface 534 configured to receive, process, and respond to low-bandwidth device control messages from a BMC or other component controller. Memory 514 may include a debug interface 538 configured to receive, process, and respond to debug data requests from debug subsystems. Memory 514 may include an access manager 542 configured to handle access and security verification for one or more interfaces of storage device 500. Memory 514 may include a storage manager 550 configured to process host storage commands through backend storage operations to non-volatile memory 520. Memory 514 may include a non-volatile memory (NVM) controller 562 configured to manage read and write operations to non-volatile memory devices 520, such as the backend storage operations determined by storage manager 550. Memory 514 may include control functions 564 configured to process control commands received through control interface 534. Memory 514 may include debug functions 566 configured to process debug commands received through debug interface 538. Memory 514 may include a failure reconfiguration manager 570 configured to handle reconfiguration of side channels, such as control interface 534 and debug interface 538, for receiving, forwarding, and responding to host storage commands.

Host interface 530 may include an interface protocol and/or set of functions and parameters for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. Host interface 530 may include a storage interface protocol 532 that defines a set of host storage commands that may be transferred from a host system to storage device 500 using a defined set of functions and syntax. For example, storage interface protocol 532 may include an interface definition compliant with NVMe standards for receiving host storage commands to a submission queue allocated to a host connection and returning response messages through a completion queue and/or interrupt message passing. In some configurations, storage interface protocol 532 may enable direct memory access to command queues and memory buffers through storage bus interface 516 for accessing host data units 520.1 stored in non-volatile memory devices 520. For example, host interface 530 may include host communication protocols compatible with PCIe, SATA, SAS, and/or another bus interface that supports use of NVMe and/or RDMA storage protocols for data access to host data 520.1. In some configurations, host interface 530 may include or interface with access control services through access manager 542 to authenticate connections, sessions, and/or commands received through host interface 530.

Control interface 534 may include an interface protocol and/or set of functions and parameters for receiving, parsing, responding to, and otherwise managing control requests from a component management system, such as a BMC, that may manage power states, sensors, indicators, cooling systems, and other components of storage devices and their enclosures. For example, control interface 534 may include a low-bandwidth messaging interface for communication with a BMC, peer storage devices, fans, sensors, and other components associated with the physical environment of storage device 500. Control interface 534 may include a control interface protocol 536 including interfaces, functions, and parameters for communication within the host or an associated BMC using multi-master discovery and messaging compliant with a low-bandwidth interface standard. For example, storage device 500 may be configured for packet-based messaging through control bus interface 518 using a low-bandwidth bus protocol, such as I2C, I3C, SMBus, etc. In some configurations, control interface protocol 536 may provide a low-bandwidth communication channel with the host and other system components to assist with power management, discovery, and access to external resources, such as temperature sensors, fan controllers, light emitting diode (LED) indicators, etc. For example, control bus interface 518 may connect storage device 500 to a BMC for monitoring the physical state of storage device 500. In some configurations, control interface 534 may include or interface with access control services through access manager 542 to authenticate connections, sessions, and/or commands received through control interface 534.

Debug interface 538 may include an interface protocol and/or set of functions and parameters for receiving, parsing, responding to, and otherwise managing debug data requests from a debug system. For example, debug interface 538 may include functions for receiving and processing requests for reading debug logs, configuration pages, and other system data stored in a system partition of storage device 500. Debug interface 538 may include a debug interface protocol 540 that defines a set of debug commands or queries that may be transferred from a debug system to storage device 500 using a defined set of functions and syntax. For example, debug interface protocol 540 may include a communication protocol definition compliant with PCIe standards for enabling one-way access to the system partition for processing page access queries. In some configurations, debug interface 538 may include or interface with access control services through access manager 542 to authenticate connections, sessions, and/or commands received through debug interface 538.

Access manager 542 may include functions, parameters, data structures, and/or interfaces for providing access control services to one or more interfaces of storage device 500. For example, access manager 542 may be configured to provide authentication and/or encryption/decryption services for messages received through host interface 530, control interface 534, and/or debug interface 538. In some configurations, access manager 542 may include a verification service 544 for determining whether the source of a connection, session, and/or message is an authenticated host system for accessing storage device 500 and/or the specific partition or namespace being targeted. For example, access manager 542 may receive and/or parse one or more host credentials from a message received by one of the interfaces to determine whether it is a valid credential. In some configurations, access manager 542 may include or access an access control list 546 comprised of authenticated host systems. For example, host identifiers may be mapped in access control list 546 to a defined set of permissions for the partitions or namespaces associated with that host identifier and, in some cases, authorized operation types (such as read only, write only, etc.). Access manager 542 may manage and/or access a credential page 520.3 stored in non-volatile memory 520 and including a list of authorized host identifiers. Access manager 542 may manage and/or access a permission page 520.4 stored in non-volatile memory 520 and including permission indicators mapping host identifiers to specific partitions and/or command types they are authorized to execute. In some configurations, credential page 520.2 and/or permission page 520.4 may include separate sets of host credentials and corresponding permissions for one or more failover modes and these credentials and permissions may be different than those used during normal operating modes. In some configurations, access manager 542 may include an encryption service 548 configured to use an encryption/decryption engine to encrypt and/or decrypt message data and/or payload data (host data, control data, and/or debug data). Encryption service 548 may include key management, such as public-private key pairs exchanged with one or more host systems, and host-specific keys may be stored and accessed by encryption service 548, such as in credential page 520.3. In some configurations, access manager 542 may be called by each of the interfaces and support authentication and/or encryption based on their respective interface protocols. In failover modes, access manager 542 may be invoked to resolve both the native interface authentication and/or encryption and the authentication and/or encryption of host storage commands tunneled through control interface 534 or debug interface 538.

Storage manager 550 may include functions, parameters, data structures, and/or interfaces for receiving and executing host storage commands targeting host data 520.1 in non-volatile memory 520. For example, storage manager 270 may be configured to receive host storage commands through host interface 530, parse them into backend storage operations, and execute those operations using NVM controller 562. In some configurations, storage manager 550 may also process internal storage commands for accessing device data stored in one or more system partitions, such as debug data 520.2 and configuration pages (e.g., credential page 520.3, and permission page 520.4). Storage manager 550 may include hardware and/or software modules for executing specific functions, such as a host command handler 552, a partition manager 554, command queues 556, and backend operation interface 558.

Host command handler 552 may include logic for receiving and parsing host storage commands. For example, host command handler 552 may be configured for the command syntax of storage interface protocol 532 and parse command parameters from host storage commands for generating backing storage operations for execution by NVM controller 562. In some configurations, host command handler 552 may be configured to receive host storage commands from one or more failover interfaces through failure reconfiguration manager 570. For example, a host storage command received during a failover mode through control interface 534 and/or debug interface 538 may be extracted or reconstructed from the payload of corresponding control or debug messages and forwarded to host command handler 552 as a host storage command complying with the syntax of storage interface protocol 532. Partition manager 554 and command queues 556 may include logic and data structures for managing host storage commands according to storage interface protocol 532. For example, partition manager 554 may be configured to manage a set of namespaces defined in memory locations of non-volatile memory 520 for storing host data 520.1 and receive selective host connections to those namespaces. Command queues 556 may include pairs of submission queues and completion queues allocated to each host connection to a namespace. During a failover mode, host storage commands received through control interface 534 and/or debug interface 538 may still include host identifiers mapped to specific namespaces and queue pairs to receive those host storage commands. In some configurations, partition manager 554 may close existing host connections and/or establish new host connections to one or more namespaces based on the failover mode and limited failover functions enabled during that failover mode. Backend operation interface 558 may include interface logic for executing the host storage commands as backend storage operations using NVM controller 562. For example, for each host storage command in a submission queue for processing, backend operation interface 558 may generate one or more read, write, and/or delete commands for processing by NVM controller 562.

NVM controller 562 may include functions, parameters, data structures, and/or interfaces for reading, writing, and deleting data units in non-volatile memory devices 520. For example, NVM controller 562 may include functions for executing host data operations related to host storage commands received through host interface 530. For example, write commands may be configured to write host data units to non-volatile memory devices 520. Read commands may be configured to read data from non-volatile memory devices 520. Deallocate commands may be configured to delete data from non-volatile memory devices 520, or at least mark a data location for deletion until a future garbage collection or similar operation actually deletes the data or reallocates the physical storage location to another purpose. In some configurations, NVM controller 562 may include flash translation layer (FTL) management, data state machine, read/write buffer management, NVM device interface protocols, NVM device configuration/management/maintenance, and other device-side functions. In some configurations, NVM controller 562 may be configured to allocate a portion of the memory locations in non-volatile memory devices 520 for storing data other than host data 520.1. For example, NVM controller 562 may allocate device or system data as memory locations reserved for internal device data, including device configuration, parameter, and internal operation data, such as debug data 520.2 and configuration pages. In some configurations, storage space allocated to device data may be excluded from the storage capacity made available to host data 520.1, such as overprovisioned storage locations hidden from the host for use storing internal configuration data, operation data, FTL tables, replacing bad blocks, etc.

Control functions 564 and debug functions 566 may be configured for processing their respective functions received through control interface 534 and debug interface 538. For example, control function 564 may receive control commands through control interface 534 with a syntax complying with control interface protocol 536. Control functions 564 may parse and execute those control commands using processor 512 and memory 514, as well as interfaces to component resources and device state machines. For example, control functions 564 may receive a control command for moving to a different power state, such as a low power mode, and may process the command to update the device power state. Debug functions 566 may receive debug commands or queries through debug interface 538 with a syntax complying with debug interface protocol 540. Debug functions 566 may parse and execute those debug commands using NVM controller 562 to access device data stored in non-volatile memory 520, such as debug data 520.2. During failover operations, control functions 564 and debug functions 566 may process control commands and/or debug commands through their respective interfaces and/or control functions 564 and/or debug functions 566 may be suspended or limited to reserve bandwidth for host storage commands. For example, in some failure modes, control commands may be limited to failover power commands and/debug commands may be suspended.

Failure reconfiguration manager 570 may include functions, parameters, data structures, and/or interfaces for determining a failover condition and reconfiguring one or more side channels, such as control interface 534 and/or debug interface 538, to receive host storage commands for processing by storage manager 550. For example, storage device 500 may receive a failover message from one or more hosts through one of the interfaces to trigger failure reconfiguration manager 570 to enable limited host storage commands to be received through control interface 534 and/or debug interface 538 by tunneling host storage commands according to storage interface protocol 532 in the payload of messages sent using control interface protocol 536 and/or debug interface protocol 540. Failure reconfiguration manager 570 may include a plurality of software and/or hardware modules stored in memory 514 for execution by processor 512 to execute various functions of failure reconfiguration manager 570.

In some configurations, an interface check manager 572 may be configured to receive a failover message through one or more of interfaces 530, 534, and/or 538 to initiate a failover mode 586 and resulting failover functions 588. For example, one or more host systems may determine a failure of host interface 530 for receiving, processing, and/or responding to host storage requests and send a failover message to one or more of host interface 530, control interface 534, and/or debug interface 538. In some configurations, the failover message may be sent using the native interface protocol of the interface being used to increase a likelihood of the message being successfully received. In some configurations, interface check manager 572 may respond to interface errors detected by storage device 500 without receiving a failover message from a host. Interface check manager 572, may respond to the failover message and/or other determination of failure of host interface 530 by checking each interface and/or an indicated failover interface to determine whether communications can (still) be established with one or more host systems. In some configurations, interface check manager 572 may wait for failover test messages from one or more hosts to check that interface and respond as defined by the interface protocols for that interface.

In some configurations, the failover message and/or test messages may trigger interface adjustment logic 574 to adjust one or more interface parameters to establish, reestablish, and/or improve transport-layer connectivity and/or transfer bandwidth/reliability through one or more failover interfaces. For example, interface adjustment logic 574 may initialize or re-initialize establishment of the transport connection by varying parameter sets and/or handshake procedures for determining the signal, synchronization, and messaging configuration for failover operations. In some configurations, the failover message and/or test messages may trigger failover function tests 576 to respond to one or more function tests initiated by one or more host systems to test the capabilities of one or more interfaces and corresponding channels. For example, a host may issue a test message, such as a ping or test command, to each interface of interest to determine their latency, bandwidth, and/or other test metrics.

In some configurations, failure reconfiguration manager 570 may include a failover status manager 578 to respond to interface check manager 572 and/or failover messages from the hosts to recognize a failure state for at least host interface 530 and determine failover modes for one or more host connections. For example, responsive to the failover message failover status manager 578 may change an operating mode for storage device 500 to a primary host interface failure mode and/or a failover mode for one or more side channel interfaces. In some configurations, failover status manager 578 may include or interface with a failover channel selector for determining one or more failover channels for subsequent failover functions. For example, the initial failover notification message and/or a subsequent failover channel selection message may indicate the failover channel or channels to be used by each host and/or the failover mode to be activated for the selected failover channel(s). In some configurations, host systems may use application configurations for failover modes and the results of failover function tests 576 to select a best fit among available failover channels. Responsive to failover channel selector 580, failover channel interface 582 may be initiated to handle forwarding of host storage commands from the failover channel(s) to storage manager 550 for processing. For example, host storage commands may be received through control interface 534 and/or debug interface 538 according to the corresponding interface protocols and, rather than being processed by control functions 564 or debug functions 566, the host storage commands may be forwarded by failover channel interface 582 to storage manager 550. In some configurations, failover channel interface 582 may be inserted into or called from the command processing paths for the failover interfaces to intercept messages that contain a host storage command or a portion thereof. For example, each host storage command may be packaged in the payload of one or more messages according to the native interface protocols and may be identified and reassembled by failover channel interface 582 for processing by storage manager 550.

In some configurations, failure reconfiguration manager 570 may include a failover permission manager 584 to manage a limited set of host systems, partitions, and/or failover functions that may be executed during a failure condition and/or specific failover mode 586. For example, failover permission manager 584 may use access manager 542 to authenticate host systems communicating through the failover channel, such as authenticating both the use of the side channel interface and the host storage commands tunneled through the side channel interface. In some configurations, failover permission manager 584 may be configured to enforce special failover credentials and permissions for the failure condition and/or specific failover modes 586. For example, during a critical operations mode 586.1, real-time operations by critical host applications may be enabled for read/write access to their corresponding partitions or namespaces, or during a recovery mode 586.2, read-only operations transferring host data from corresponding namespaces for each host application being recovered may be enabled. Failover permission manager 584 may be configured to determine a host identifier, verify access for the host and channel(s) (e.g., using access manager 542), and determine acceptable failover functions 588 to be executed against host data 520.1. Failover permission manager 584 may be configured to reject connections, sessions, messages, and/or commands that do not comply with the failover functions enabled for a particular host and failure mode. In some configurations, failover functions may include: partition read 588.1 enabling a host to read host data previously stored to a partition (which may indicate a read-only mode); partition write 588.2 enabling a host to write new host data to a partition (with or without overwrite permission); secure erase 588.3 enabling both logical and physical erasure of host data in a partition to render it unrecoverable; data copy 588.4 enabling replication of the host data in a partition through the failover interface to the host or another storage device; and/or destructive transfer 588.5 enabling data copy 588.4 followed by secure erase 588.3.

Figure 6:
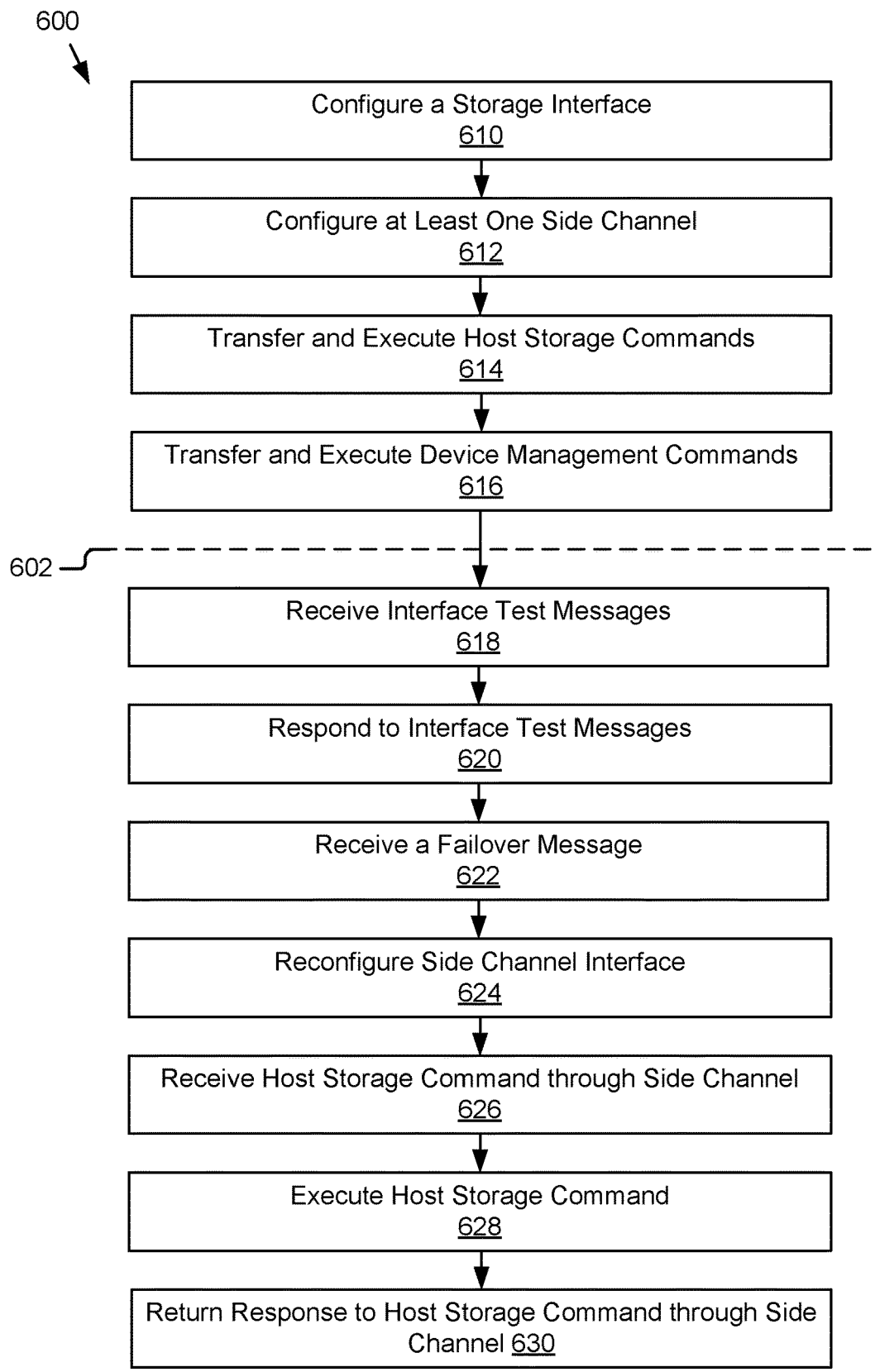
FIG. 6 is a flowchart of an example method of secure failover through a side channel in response to failure of a storage interface.

As shown in FIG. 6, storage device 500 may be operated according to an example method for secure failover through a side channel in response to failure of a storage interface, i.e., according to method 600 illustrated by blocks 610-630 in FIG. 6. Blocks 610-616, prior to storage interface failure 602, may include configuration and normal operation of storage device 500, while blocks 618-630 following storage interface failure 602 may include failover operation of storage device 500.

At block 610, a storage interface may be configured. For example, the storage device may include a PCIe interface configured for NVMe storage protocols to execute host storage commands to the storage medium of the storage device.

At block 612, at least one side channel may be configured. For example, the storage device may include one or more side channels, such as control and/or debug interfaces, with separate physical bus connections and protocols for specialized storage device functions other than host data access.

At block 614, host storage commands may be transferred and executed using the storage interface. For example, during normal operation, one or more hosts may transfer host storage commands to the storage device over the storage interface for execution by the storage device to write, read, and delete host data on the storage medium.

At block 616, device management commands may be transferred and executed using at least one side channel. For example, the storage device may use the control interface to transfer control commands for power management and component control for execution by the storage device or use the debug interface to transfer debug commands for execution by the storage device.

At block 618, an interface test message may be received. For example, the storage device may be configured to receive test messages from one or more hosts for determining the state and/or test metrics for the quality of operation of the various interfaces.

At block 620, the interface test message may be responded to. For example, the storage device may send a response message for each test message received to assist the host in evaluating the state and functionality of the various interfaces.

At block 622, a failover message may be received. For example, the storage device may receive a failover notification message indicating the failure of the storage interface with at least one host system and triggering the reconfiguration of at least one side channel to accommodate host storage commands.

At block 624, a side channel may be reconfigured for receiving host storage commands. For example, the storage device may reconfigure at least one of the side channels to receive host storage commands and forward them to the host storage path for processing.

At block 626, host storage commands may be received through the side channel. For example, the storage device may receive host storage commands tunneled through the interface protocols of the control interface or debug interface.

At block 628, host storage commands may be executed. For example, the storage device may forward host storage commands received through the control or debug channels to the storage processing path.

At block 630, a response to the host storage command may be returned through the side channel. For example, following execution of the host storage command, the storage device may return the results of the storage command in a response message through the side channel through which the command was received.

Figure 7:
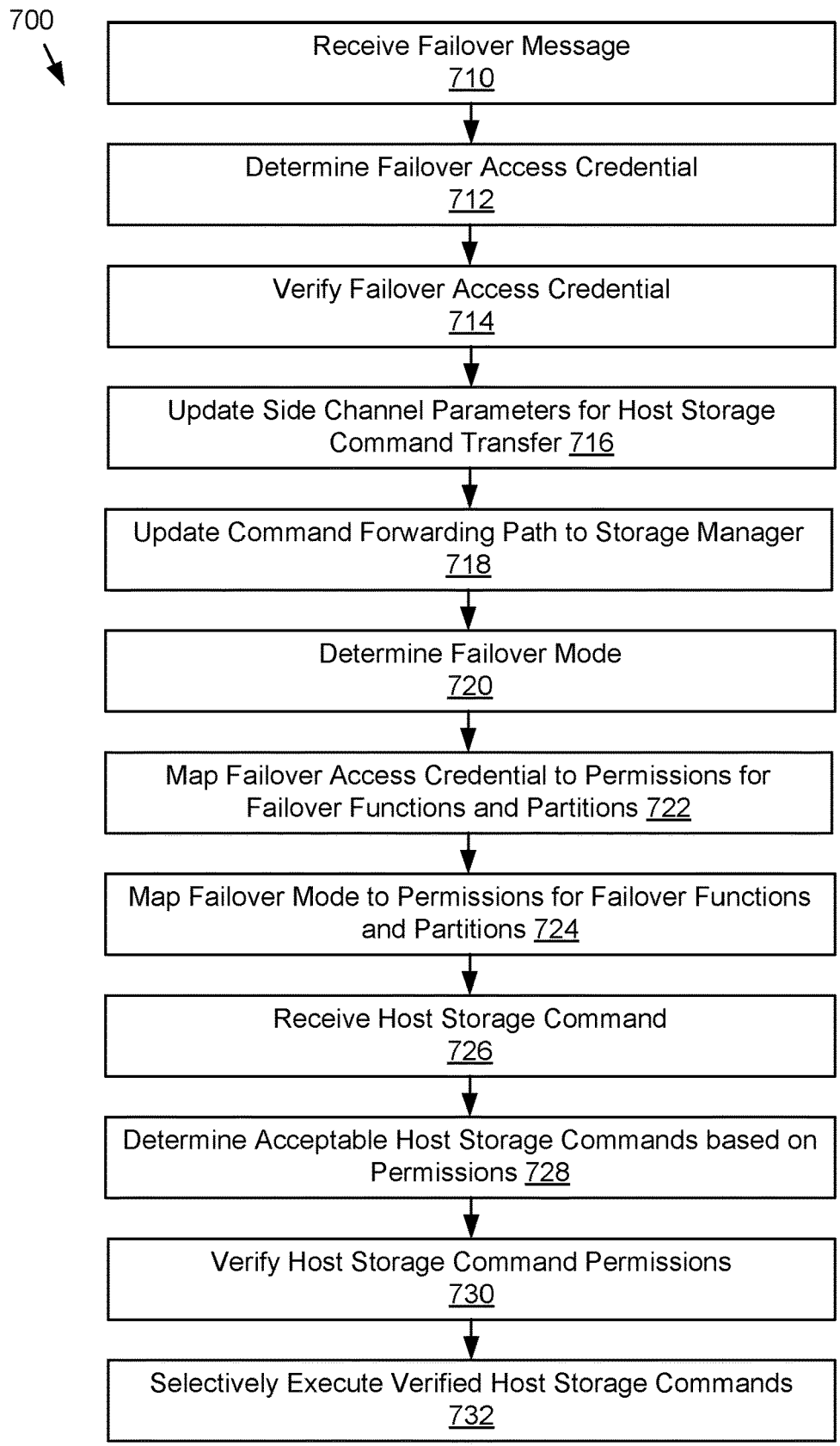
FIG. 7 is a flowchart of an example method of reconfiguring the side channel interface for handling host storage commands.

As shown in FIG. 7, storage device 500 may be operated according to an example method for reconfiguring the side channel interface for handling host storage commands, i.e., according to method 700 illustrated by blocks 710-732 in FIG. 7. In some configurations, method 700 may support the operation of blocks 624-628 of method 600.

At block 710, a failover message may be received. For example, a host system that has identified a failure of the storage interface may send a failover notification message to one or more interfaces of the storage device and it may be received by the storage device.

At block 712, a failover access credential may be determined. For example, the storage device may determine the host identifier associated with the failover message and/or a set of associated credentials, such as passcodes, encryption keys, etc. from the failover message.

At block 714, failover access credentials may be verified. For example, the storage device may verify the host identifier and associated access credentials for the host connection.

At block 716, side channel parameters may be updated for host storage command transfer. For example, the storage device may update the control or debug interface parameters to enable tunneling of host storage commands within the messages supported by their native interface protocols.

At block 718, a command forwarding path may be updated. For example, the storage device may set the side channel command processing path to forward host storage commands to the storage processing path, rather than handling it through the normal processing functions for that interface.

At block 720, a failover mode may be determined. For example, the storage device may determine a failover mode for the failover host connection based on a failover message from the host or a previously configured failover mode configured in the configuration pages of the data storage device.

At block 722, the failover access credential may be mapped for failover functions and partitions. For example, the storage device may determine failover partitions and failover functions that are acceptable for the specific host identifier and/or host connection.

At block 724, the failover mode may be mapped to permissions for failover functions and partitions. For example, the storage device may use the failover mode determined at block 720 to determine corresponding failover functions and permissions that may be accessed during the failover mode by the specific host identifier and/or host connection.

At block 726, a host storage command may be received. For example, the storage device may receive a host storage command through the side channel and determine the host connection (host identifier and target namespace) and storage command type of the host storage command.

At block 728, acceptable host storage commands based on permissions. For example, the storage device may determine a set of acceptable host storage commands corresponding to the failover functions enabled for that host identifier and/or failover mode.

At block 730, host storage command permissions may be verified. For example, the storage device may compare the host identifier, namespace, and host storage command type to the set of acceptable host storage commands determined at block 728 to verify compliance and that the host storage command may be processed.

At block 732, verified host storage commands may be executed. For example, responsive to verification at block 730, the storage device may process the host storage command and a result returned. If the host storage command is not successfully verified, the storage device may reject the host storage command.

Figure 8:
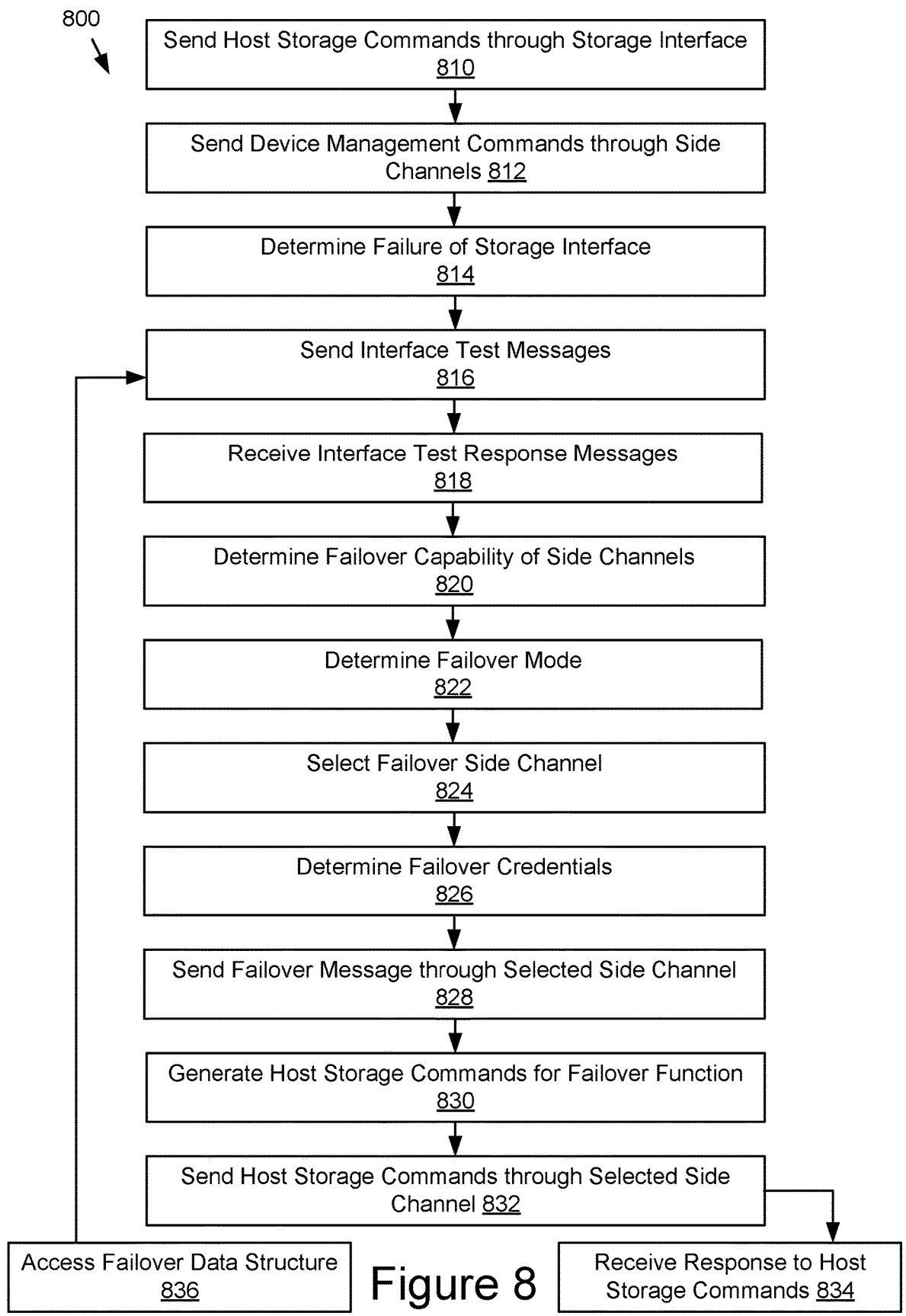
FIG. 8 is a flowchart of an example method of secure failover through a side channel from a host system perspective.

As shown in FIG. 8, host system 102 may be operated according to an example method for secure failover through a side channel, i.e., according to method 800 illustrated by blocks 810-836 in FIG. 8.

At block 810, host storage commands may be sent through a storage interface. For example, the host may send host storage commands to a storage device through the primary storage interface of the storage device.

At block 812, device management commands may be sent through side channels. For example, the host may cause an associated BMC to send power control commands to the storage device through a control channel.

At block 814, failure of the storage interface may be determined. For example, the host may respond to errors or a lack of responses through the primary storage interface to determine that the storage interface has failed.

At block 816, interface test messages may be sent. For example, the host may send one or more test messages to available interface channels to the storage device.

At block 818, interface test response messages may be received. For example, the storage device may respond to each test message received through one of its interfaces with a corresponding test response message.

At block 820, a failover capacity of the side channels may be determined. For example, test metrics based on the test messages and/or other configuration information for the side channels may allow the host to calculate failover capabilities of the side channels and/or the failed primary storage channel with some residual operational capability.

At block 822, a failover mode may be determined. For example, the host may determine a failover mode based on the current operating mode of the system, such as critical real-time operations or various offline recovery modes.

At block 824, a failover side channel may be selected. For example, based on a comparison of available side channels, the failover capacity, and the failover mode, the host may select the failover side channel for failure operations.

At block 826, failover credentials may be determined. For example, the host may determine the target namespace for the failure operations and associated failover credentials, which may include both side channel credentials and storage interface credentials.

At block 828, a failover message may be sent through the selected side channel. For example, the host may send a failover notification message to the storage device through the selected side channel.

At block 830, host storage commands corresponding to the desired failover functions may be generated. For example, the host may generate host storage commands corresponding to the determined failure operations and their corresponding storage failover functions and these storage commands may be verified for compliance with acceptable failover function command sets.

At block 832, host storage commands may be sent through the selected side channel. For example, the host may send the host storage commands generated at block 830 to the storage device through the selected side channel by tunneling the host storage command through the side channel interface protocol.

At block 834, a response may be received to the host storage commands. For example, the host may receive responses to the host storage commands tunneled through the side channel interface.

At block 836, a failover data structure may be accessed. For example, the host may be configured with a failover table that includes parameters describing the various interfaces, credentials, failover modes, and failover functions for managing failure conditions.

Figure 9:
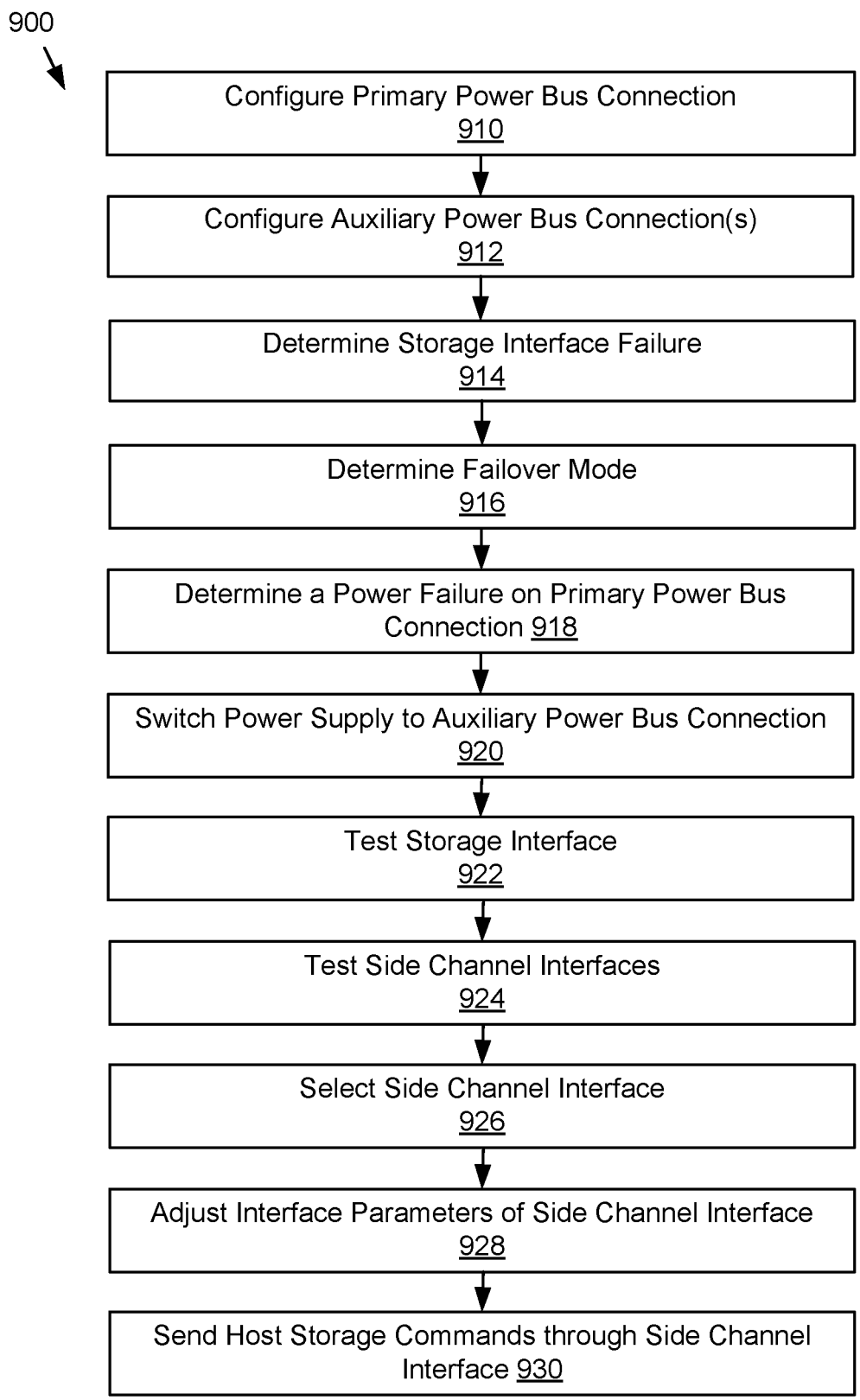
FIG. 9 is a flowchart of an example method of power failover to support failover of host storage commands to a side channel.

As shown in FIG. 9, storage system 200 may be operated according to an example method for power failover to support failover of host storage commands to a side channel, i.e., according to method 800 illustrated by blocks 910-926 in FIG. 9.

At block 910, a primary power bus connection may be configured. For example, the system may include a primary power source for the storage system and the storage devices may be connected to the primary power bus for receiving power during normal operation.

At block 912, an auxiliary power bus connection may be configured. For example, the system may include an auxiliary power source for the storage system and the storage devices may be connected to the auxiliary power bus for receiving power during interruptions of the primary power source.

At block 914, a storage interface failure may be determined. For example, the host may respond to errors or a lack of responses through the primary storage interface to determine that the storage interface has failed.

At block 916, a failover mode may be determined. For example, the host may determine a failover mode for desired failure operations.

At block 918, a power failure may be determined on the primary power bus connection. For example, the host may determine from the BMC that the storage device no longer has power.

At block 920, the power supply may be switched to the auxiliary power bus connection. For example, the host may switch the power source to the auxiliary power source and corresponding power bus connection.

At block 922, the storage interface may be tested. For example, the host may test the primary storage interface to determine whether the power interruption was the sole cause of the interface failure.

At block 924, a side channel interface may be tested. For example, responsive to continued errors or lack of response from the primary storage interface, one or more side channel interfaces may be tested.

At block 926, a side channel interface may be selected. For example, an available side channel may be selected for failover operations.

At block 928, interface parameters of the selected side channel may be adjusted. For example, the host may initiate adjustment of signal, synchronization, and/or message parameters.

At block 930, host storage commands may be sent through the side channel interface. For example, the host may send host storage commands through the side channel interface to the storage device for processing and return of responses.

While at least one exemplary embodiment has been presented in the foregoing detailed description of the technology, it should be appreciated that a vast number of variations may exist. It should also be appreciated that an exemplary embodiment or exemplary configurations are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
  a data storage device comprising:
    a storage medium configured to store host data;
    a storage interface configured to:
      use a first interface protocol and a first physical bus connection; and
      connect to a host system for transferring host storage commands and host data;
    a side channel interface configured to:
      use a second interface protocol and a second physical bus connection; and
      connect to the host system for transferring low-bandwidth device management commands; and
    a controller configured to:
      receive, through the side channel interface, a failover message indicating a failure of the storage interface;
      determine, responsive to the failover message, a failover mode from a plurality of failover modes;
      determine a set of acceptable host storage commands for the failover mode;
      reconfigure the side channel interface to support selective processing of host storage commands;
      receive, through the side channel interface, a host storage command;
      verify the host storage command complies with the set of acceptable host storage commands;
      execute, using the storage medium and responsive to verifying that the host storage command complies with the set of acceptable host storage commands, the host storage command; and
      return, through the side channel interface, a response to the host storage command.

2. The system of claim 1, wherein:
  the controller is further configured to:
    determine, responsive to the failover message, a failover access credential; and
    verify the failover access credential; and
  executing the host storage command is responsive to verification of the failover access credential.

3. The system of claim 2, wherein:
  the controller is further configured to:
    map the failover access credential to at least one failover function; and
    verify, based on the at least one failover function, the host system has permission to send the host storage command; and
  executing the host storage command is responsive to verification of the permission to send the host storage command.

4. The system of claim 3, wherein the at least one failover function is selected from:
  write access to a predetermined partition of a plurality of partitions on the storage medium;
  read only access to the predetermined partition of the plurality of partitions on the storage medium;

duplication, to a different data storage device, of the predetermined partition of the plurality of partitions on the storage medium;
secure erase of the predetermined partition of the plurality of partitions on the storage medium; and
transfer and secure erase of the predetermined partition of the plurality of partitions on the storage medium.

5. The system of claim 1, wherein the plurality of failover modes comprises at least one mode selected from:
a critical mode configured to access operations data stored on the storage medium;
a security mode configured to disable access to secure data stored on the storage medium;
a maintenance mode configured to access maintenance data stored on the storage medium;
an investigation mode configured to access historical log data stored on the storage medium; and
a replication mode configured to duplicate data stored on the storage medium to another storage medium.

6. The system of claim 1, wherein:
the controller is further configured to:
receive, through the side channel interface, an interface test message; and
send, through the side channel interface, an interface test response message;
the host system is configured to determine, based on the interface test response, a failover capability of the side channel interface; and
receiving the host storage command is responsive to the interface test response.

7. The system of claim 6, wherein:
the side channel interface is a selected side channel interface of a plurality of side channel interfaces of the data storage device;
the controller is further configured to:
receive the interface test message through each side channel interface of the plurality of side channel interfaces; and
send, through that side channel interface of the plurality of side channel interfaces, the interface test response;
the plurality of side channel interfaces comprises:
a control bus interface configured for low-bandwidth device control functions; and
a debug bus interface configured for low-bandwidth device debug functions;
each side channel interface of the plurality of side channel interfaces is configured to use:
a different interface protocol; and
a different physical interface bus; and
the host system is further configured to select the selected side channel interface from the plurality of side channel interfaces based on at least one interface test response through at least one side channel interface of the plurality of side channel interfaces.

8. The system of claim 1, further comprising the host system, the host system comprising:
a host processor;
a host memory;
a host storage interface configured to, during a normal operating mode, communicate with the data storage device using the first interface protocol and the first physical bus connection for transferring host storage commands;
a host side channel interface configured to:
during the normal operating mode, communicate with the data storage device using the second interface protocol and the second physical bus connection for transferring low-bandwidth device management commands; and
during a failover mode, communicate with the data storage device using the second interface protocol and the second physical bus connection for transferring host storage commands;
a host storage controller configured to:
determine the failure of the storage interface of the data storage device;
determine, responsive to the failure of the storage interface of the data storage device, the failover mode;
send, through the host side channel interface, the failover message;
send, through the host side channel interface, the host storage command; and
receive, through the host side channel interface, the response to the host storage command.

9. The system of claim 8, wherein:
the host memory comprises a failover data structure; and
the failover data structure comprises a plurality of interface entries corresponding to a plurality of physical interface connections to the data storage device;
each interface entry of the plurality of interface entries comprises:
an interface identifier for that physical interface connection;
at least one set of failover access credentials for that physical interface connection; and
at least one failover function for that physical interface connection; and
the host controller is further configured to:
test, responsive to the failure of the storage interface of the data storage device, the plurality of physical interface connections to determine at least one test metric for each physical interface connection of the plurality of physical interface connections;
select the host side channel interface from the plurality of physical interface connections based on:
the at least one test metric;
the failover mode; and
the plurality of interface entries;
send at least one failover access credential from the set of failover access credentials in the interface entry corresponding to the host side channel interface; and
generate the host storage command based on the at least one failover function from the interface entry corresponding to the host side channel interface.

10. The system of claim 8, wherein:
the data storage device further comprises:
a first power bus connection; and
a second power bus connection; and
the host controller is further configured to:
determine a power failure for the first power bus connection;
switch, responsive to the power failure, a power supply to the data storage device using the second power bus connection; and
adjust, responsive to the failure of the storage interface of the data storage device, at least one interface parameter of the host side channel interface for transmission of the host storage command through the host side channel interface.

11. A computer-implemented method, comprising:
during a normal operating mode:
transferring, through a storage interface using a first interface protocol and a first physical bus connection, host storage commands and host data from a host system for storage to a storage medium of a data storage device; and
transferring, through a side channel interface using a second interface protocol and a second physical bus connection, low-bandwidth device management commands for execution by the data storage device; and
during a failover operating mode:
receiving, by the data storage device and through the side channel interface, a failover message indicating a failure of the storage interface;
reconfiguring, by the data storage device, the side channel interface to support selective processing of host storage commands;
receiving, by the data storage device and through the side channel interface, an interface test message;
sending, by the data storage device and through the side channel interface, an interface test response message;
determining, based on the interface test response, a failover capability of the side channel interface;
receiving, by the data storage device and through the side channel interface, a host storage command;
executing, by the data storage device and using the storage medium, the host storage command; and
returning, by the data storage device and through the side channel interface, a response to the host storage command.

12. The computer-implemented method of claim 11, further comprising:
determining, by the data storage device and responsive to the failover message, a failover access credential; and
verifying, by the data storage device, the failover access credential, wherein executing the host storage command is responsive to verification of the failover access credential.

13. The computer-implemented method of claim 12, further comprising:
mapping, by the data storage device, the failover access credential to at least one failover function; and
verifying, based on the at least one failover function, the host system has permission to send the host storage command, wherein executing the host storage command is responsive to verification of the permission to send the host storage command.

14. The computer-implemented method of claim 11, further comprising:
determining, by the data storage device and responsive to the failover message, a failover mode from a plurality of failover modes;
determining, by the data storage device, a set of acceptable host storage commands for the failover mode; and
verifying, by the data storage device, the host storage command complies with the set of acceptable host storage commands, wherein executing the host storage command is responsive to verification of compliance with the set of acceptable host storage commands.

15. The computer-implemented method of claim 14, wherein the plurality of failover modes comprises at least one mode selected from:
a critical mode configured to access operations data stored on the storage medium;
a security mode configured to disable access to secure data stored on the storage medium;
a maintenance mode configured to access maintenance data stored on the storage medium;
an investigation mode configured to access historical log data stored on the storage medium; and
a replication mode configured to duplicate data stored on the storage medium to another storage medium.

16. The computer-implemented method of claim 11, further comprising:
receiving, by the data storage device, the interface test message through each side channel interface of a plurality of side channel interfaces of the data storage device, wherein:
the plurality of side channel interfaces comprises:
a control bus interface configured for low-bandwidth device control functions; and
a debug bus interface configured for low-bandwidth device debug functions; and
each side channel interface of the plurality of side channel interfaces is configured to use:
a different interface protocol; and
a different physical interface bus;
sending, by the data storage device and through each side channel interface of the plurality of side channel interfaces, the interface test response; and
selecting, based on at least one interface test response from plurality of side channel interfaces, the side channel interface as a selected side channel interface of the plurality of side channel interfaces of the data storage device.

17. The computer-implemented method of claim 11, further comprising:
determining the failure of the storage interface of the data storage device;
determining, responsive to the failure of the storage interface of the data storage device, the failover mode;
sending, responsive to determining the failover mode and through the side channel interface, the failover message;
sending, through the side channel interface, the host storage command; and
receiving, through the side channel interface, the response to the host storage command.

18. The computer-implemented method of claim 17, further comprising:
accessing a failover data structure, wherein:
the failover data structure comprises a plurality of interface entries corresponding to a plurality of physical interface connections to the data storage device; and
each interface entry of the plurality of interface entries comprises:
an interface identifier for that physical interface connection;
at least one set of failover access credentials for that physical interface connection; and
at least one failover function for that physical interface connection;
testing, responsive to the failure of the storage interface of the data storage device, the plurality of physical interface connections to determine at least one test metric for each physical interface connection of the plurality of physical interface connections;

selecting the side channel interface from the plurality of physical interface connections based on:
- the at least one test metric;
- the failover mode; and
- the plurality of interface entries;

sending at least one failover access credential from the set of failover access credentials in the interface entry corresponding to the side channel interface; and generating the host storage command based on the at least one failover function from the interface entry corresponding to the side channel interface.

19. The computer-implemented method of claim 17, further comprising:

determining a power failure for a first power bus connection, wherein the data storage device comprises:
- the first power bus connection; and
- a second power bus connection;

switching, responsive to the power failure, a power supply to the data storage device using the second power bus connection; and adjusting, responsive to the failure of the storage interface of the data storage device, at least one interface parameter of the side channel interface for transmission of the host storage command through the side channel interface.

20. A data storage device, comprising:

a storage medium configured to store host data;

a storage interface configured to:
- use a first interface protocol and a first physical bus connection; and
- connect to a host system for transferring host storage commands and host data;

a side channel interface configured to:
- use a second interface protocol and a second physical bus connection; and
- connect to the host system for transferring low-bandwidth device management commands;

means for receiving, through the side channel interface, a failover message indicating a failure of the storage interface;

means for determining, responsive to the failover message, a failover mode from a plurality of failover modes;

means for determining a set of acceptable host storage commands for the failover mode;

means for reconfiguring the side channel interface to support selective processing of host storage commands;

means for receiving, through the side channel interface, a host storage command;

means for verifying the host storage command complies with the set of acceptable host storage commands;

means for executing, using the storage medium, the host storage command; and means for returning, through the side channel interface, a response to the host storage command.

* * * * *